United States Patent
Hakuta et al.

(10) Patent No.: US 10,099,317 B2
(45) Date of Patent: Oct. 16, 2018

(54) SOUNDPROOF STRUCTURE AND SOUNDPROOF STRUCTURE MANUFACTURING METHOD

(71) Applicant: FUJIFILM Corporation, Tokyo (JP)

(72) Inventors: Shinya Hakuta, Ashigara-kami-gun (JP); Shogo Yamazoe, Ashigara-kami-gun (JP); Tatsuya Yoshihiro, Ashigara-kami-gun (JP); Akihiko Ohtsu, Ashigara-kami-gun (JP); Tadashi Kasamatsu, Ashigara-kami-gun (JP); Masayuki Naya, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/679,650

(22) Filed: Aug. 17, 2017

(65) Prior Publication Data

US 2017/0341186 A1 Nov. 30, 2017

Related U.S. Application Data

(63) Continuation of application No. PCT/JP2016/055904, filed on Feb. 26, 2016.

(30) Foreign Application Priority Data

Feb. 27, 2015 (JP) .................................. 2015-039513
Jun. 17, 2015 (JP) .................................. 2015-121994

(51) Int. Cl.
*E04B 1/86* (2006.01)
*B23K 26/382* (2014.01)
(Continued)

(52) U.S. Cl.
CPC ............. *B23K 26/382* (2015.10); *B23K 26/00* (2013.01); *E04B 1/86* (2013.01); *G10K 11/16* (2013.01); *G10K 11/162* (2013.01)

(58) Field of Classification Search
CPC ......... B23K 26/382; B23K 26/00; E04B 1/86; G10K 11/162; G10K 11/16
(Continued)

(56) References Cited

U.S. PATENT DOCUMENTS 4,787,473 A * 11/1988 Fuchs .................... F16L 55/033
181/224
5,241,512 A * 8/1993 Argy ..................... G10K 11/172
181/198
(Continued)

FOREIGN PATENT DOCUMENTS

JP 10-326097 A 12/1998
JP 2005-250474 A 9/2005
(Continued)

OTHER PUBLICATIONS

International Search Report for PCT/JP2016/055904 dated May 17, 2016.
(Continued)

*Primary Examiner* — Forrest M Phillips
(74) *Attorney, Agent, or Firm* — Birch, Stewart, Kolasch & Birch, LLP

(57) ABSTRACT

A soundproof structure has one or more soundproof cells. Each of the one or more soundproof cells includes a frame having a through-hole, a film fixed to the frame, and an opening portion configured to include one or more holes drilled in the film. Neither end portions of the through-hole of the frame are closed. The soundproof structure has a shielding peak frequency, which is determined by the opening portion of each of the one or more soundproof cells and at which a transmission loss is maximized, on a lower frequency side than a first natural vibration frequency of the film of each of the one or more soundproof cells, and selectively insulates sound in a predetermined frequency band including the shielding peak frequency at its center.

(Continued)

Accordingly, there is provided a soundproof structure that is light and thin, does not depend on the position and shape of a hole, has high robustness as a sound insulation material, is stable, has air permeability, has no heat, and is excellent in manufacturability, and a soundproof structure manufacturing method.

28 Claims, 11 Drawing Sheets

(51) Int. Cl.
    *G10K 11/16*      (2006.01)
    *B23K 26/00*      (2014.01)
    *G10K 11/162*     (2006.01)

(58) Field of Classification Search
    USPC .......................................................... 181/293
    See application file for complete search history.

(56) References Cited

U.S. PATENT DOCUMENTS

| | | | | |
|---|---|---|---|---|
| 5,975,238 A * | 11/1999 | Fuchs | .................. | E04B 1/8209 181/286 |
| 6,598,701 B1 * | 7/2003 | Wood | .................. | G10K 11/162 181/284 |
| 6,609,592 B2 * | 8/2003 | Wilson | ..................... | B32B 3/20 181/292 |
| 6,977,109 B1 * | 12/2005 | Wood | ..................... | G10K 11/16 181/292 |
| 7,395,898 B2 * | 7/2008 | Yang | ..................... | G10K 11/172 181/286 |
| 8,857,563 B1 * | 10/2014 | Chang | ....................... | H03H 9/25 181/286 |
| 8,869,933 B1 * | 10/2014 | McKnight | ............ | G10K 11/172 181/207 |
| 9,466,283 B2 * | 10/2016 | Yang | ..................... | G10K 11/175 |
| 2005/0189165 A1 * | 9/2005 | Mathur | ............... | F16F 15/0237 181/207 |
| 2018/0051462 A1 | 2/2018 | Hakuta et al. | | |
| 2018/0082668 A1 | 3/2018 | Yamazoe et al. | | |

FOREIGN PATENT DOCUMENTS

| | | |
|---|---|---|
| JP | 2009-139556 A | 6/2009 |
| JP | 4832245 B2 | 12/2011 |
| WO | WO 2008/155981 A1 | 12/2008 |

OTHER PUBLICATIONS

Office Action for JP 2015-121994 dated Feb. 9, 2016.
Written Opinion of the International Searching Authority for PCT/JP2016/055904 dated May 17, 2016.
Extended European Search Report for corresponding European Application No. 16755717.2, dated May 4, 2018.

* cited by examiner

SOUNDPROOF STRUCTURE AND SOUNDPROOF STRUCTURE MANUFACTURING METHOD

CROSS REFERENCE TO RELATED APPLICATIONS

This application is a continuation application of International Application No. PCT/JP2016/055904 filed on Feb. 26, 2016, which claims priority under 35 U.S.C. 119(a) to Japanese Patent Application No. 2015-039513 filed on Feb. 27, 2015 and Japanese Patent Application No. 2015-121994 filed on Jun. 17, 2015. Each of the applications hereby expressly incorporated by reference into the present application.

BACKGROUND OF THE INVENTION

1. Field of the Invention

The present invention relates to a soundproof structure and a soundproof structure manufacturing method, and more particularly to a soundproof structure that is formed by one soundproof cell, which includes a frame, a film fixed to the frame, and an opening portion including one or more holes drilled in the film, or formed by arranging a plurality of soundproof cells in a two-dimensional manner and that is for strongly shielding the sound of a target frequency selectively, and a soundproof structure manufacturing method for manufacturing such a soundproof structure.

2. Description of the Related Art

In the case of a general sound insulation material, as the mass increases, the sound is shielded better. Accordingly, in order to obtain a good sound insulation effect, the sound insulation material itself becomes large and heavy. On the other hand, in particular, it is difficult to shield the sound of low frequency components. In general, this region is called a mass law, and it is known that the shielding increases by 6 dB in a case where the frequency doubles.

Thus, most conventional soundproof structures are disadvantageous in that the soundproof structures are large and heavy due to sound insulation by the mass of the structures and that it is difficult to shield low frequencies.

For this reason, as a sound insulation material corresponding to various situations, such as equipment, automobiles, and general households, a light and thin sound insulation structure has been demanded. In recent years, therefore, a sound insulation structure for controlling the vibration of a film by attaching a frame to a thin and light film structure has been drawing attention (refer to JP4832245B and U.S. Pat. No. 7,395,898B (corresponding Japanese Patent Application Publication: JP2005-250474A)).

In the case of these structures, the principle of sound insulation is a stiffness law different from the mass law described above. Accordingly, low frequency components can be further shielded even with a thin structure. This region is called a stiffness law, and the behavior is the same as in a case where a film has a finite size matching a frame opening portion since the film vibration is fixed at the frame portion.

JP4832245B discloses a sound absorber that has a frame body, which has a through-hole formed therein, and a sound absorbing material, which covers one opening of the through-hole and whose first storage modulus E1 is $9.7 \times 10^6$ or more and second storage modulus E2 is 346 or less (refer to abstract, claim 1, paragraphs [0005] to [0007] and [0034], and the like). The storage modulus of the sound absorbing material means a component, which is internally stored, of the energy generated in the sound absorbing material by sound absorption.

In JP4832245B, in the embodiment, by using a sound absorbing material containing a resin or a mixture of a resin and a filler as a mixing material, it is possible to obtain the peak value of the sound absorption rate in the range of 0.5 to 1.0 and the peak frequency in the range of 290 to 500 Hz and to achieve a high sound absorption effect in a low frequency region of 500 Hz or less without increasing the size of the sound absorber.

In addition, U.S. Pat. No. 7,395,898B (corresponding Japanese Patent Application Publication: JP2005-250474A) discloses a sound attenuation panel including an acoustically transparent two-dimensional rigid frame divided into a plurality of individual cells, a sheet of flexible material fixed to the rigid frame, and a plurality of weights, and a sound attenuation structure (refer to claims 1, 12, and 15, FIG. 4, page 4, and the like). In the sound attenuation panel, the plurality of individual cells are approximately two-dimensional cells, each weight is fixed to the sheet of flexible material so that the weight is provided in each cell, and the resonance frequency of the sound attenuation panel is defined by the two-dimensional shape of each cell individual cell, the flexibility of the flexible material, and each weight thereon.

U.S. Pat. No. 7,395,898B (corresponding Japanese Patent Application Publication: JP2005-250474A) discloses that the sound attenuation panel has the following advantages compared with the related art. That is, (1) the acoustic attenuation panel can be made very thin. (2) The acoustic attenuation panel can be made very light (with a low density). (3) The panel can be laminated together to form a local resonance sound material (LRSM) in a wide frequency range since the panel does not follow the mass law over a wide frequency range, and in particular, this can deviate from the mass law at frequencies lower than 500 Hz. (4) The panel can be easily and inexpensively manufactured (refer to page 5, line 65 to page 6, line 5).

SUMMARY OF THE INVENTION

Incidentally, since the sound absorber disclosed in JP4832245B is light and the peak value of the sound absorption rate is as high as 0.5 or more, it is possible to achieve a high sound absorption effect in a low frequency region where the peak frequency is 500 Hz or less. However, there has been a problem that the range of selection of a sound absorbing material is narrow and accordingly it is difficult to achieve the high sound absorption effect in a low frequency region.

Since the sound absorbing material of such a sound absorber completely blocks the through-hole of the frame body, the sound absorbing material does not allow the wind or heat to pass therethrough and accordingly the heat tends to be caught thereinside. Therefore, there has been a problem that this is not suitable for the sound insulation of equipment and automobiles, which is disclosed in JP4832245B in particular.

In addition, the sound insulation performance of the sound absorber disclosed in JP4832245B changes smoothly according to the usual stiffness law or mass law. For this reason, it has been difficult to effectively use the sound absorber in general equipment and automobiles in which specific frequency components, such as motor sounds, are often strongly generated in a pulsed manner.

In U.S. Pat. No. 7,395,898B (corresponding Japanese Patent Application Publication: JP2005-250474A), the sound attenuation panel can be made very thin and light at low density, can be used at frequencies lower than 500 Hz, can deviate from the law of mass density, and can be easily manufactured at low cost. However, as a lighter and thinner sound insulation structure required in equipment, automobiles, general households, and the like, there are the following problems.

In the sound attenuation panel disclosed in U.S. Pat. No. 7,395,898B (corresponding Japanese Patent Application Publication: JP2005-250474A), a weight is essential for the film. Accordingly, since the structure becomes heavy, it is difficult to use the sound attenuation panel in equipment, automobiles, general households, and the like.

There is no easy means for placing the weight in each cell structure. Accordingly, there is no manufacturability.

Since the frequency and size of shielding strongly depend on the weight of the weight and the position of the weight on the film, robustness as a sound insulation material is low. Accordingly, there is no stability.

Since the film is specified as an impermeable film, the film does not allow the wind or heat to pass therethrough and accordingly the heat tends to be caught thereinside. For this reason, this is not suitable for the sound insulation of equipment and automobiles in particular.

An object of the present invention is to solve the aforementioned problems of the conventional techniques and provide a soundproof structure which is light and thin, in which sound insulation characteristics such as a shielding frequency and a shielding size do not depend on the position and shape of the hole, which has high robustness as a sound insulation material and is stable, which has air permeability so that wind and heat can pass therethrough and accordingly has no heat thereinside, which is suitable for equipment, automobiles, and household applications, and which is excellent in manufacturability, and a soundproof structure manufacturing method capable of reliably and easily manufacturing such a soundproof structure.

In the present invention, "soundproof" includes the meaning of both "sound insulation" and "sound absorption" as acoustic characteristics, but in particular, refers to "sound insulation". "Sound insulation" refers to "shielding sound", that is, "not transmitting sound", and accordingly, includes "reflecting" sound (reflection of sound) and "absorbing" sound (absorption of sound) (refer to Sanseido Daijibin (Third Edition) and http://www.onzai.or.jp/question/sound-proof.html and http://www.onzai.or.jp/pdf/new/gijutsu201312_3.pdf on the web page of the Japan Acoustological Materials Society).

Hereinafter, basically, "sound insulation" and "shielding" will be referred to in a case where "reflection" and "absorption" are not distinguished from each other, and "reflection" and "absorption" will be referred to in a case where "reflection" and "absorption" are distinguished from each other.

In order to achieve the aforementioned object, a soundproof structure of the present invention is a soundproof structure comprising one or more soundproof cells. Each of the one or more soundproof cells comprises a frame having a through-hole, a film fixed to the frame, and an opening portion configured to include one or more holes drilled in the film. Neither end portions of the through-hole of the frame are closed. The soundproof structure has a shielding peak frequency, which is determined by the opening portion of each of the one or more soundproof cells and at which a transmission loss is maximized, on a lower frequency side than a first natural vibration frequency (the first mode resonant frequency) of the film of each of the one or more soundproof cells, and selectively insulates sound in a predetermined frequency band including the shielding peak frequency at its center.

Here, it is preferable that the one or more soundproof cells are a plurality of soundproof cells arranged in a two-dimensional manner.

It is preferable that the first natural vibration frequency is determined by a geometric form of the frame of each of the one or more soundproof cells and stiffness of the film of each of the one or more soundproof cells and that the shielding peak frequency is determined according to an area of the opening portion of each of the one or more soundproof cells.

It is preferable that the first natural vibration frequency is determined by a shape and a size of the frame of each of the one or more soundproof cells and thickness and flexibility of the film of each of the one or more soundproof cells and that the shielding peak frequency is deter mined according to an average area ratio of the opening portions of the one or more soundproof cells.

It is preferable that the first natural vibration frequency is included within a range of 10 Hz to 100000 Hz.

It is preferable that, assuming that a circle equivalent radius of the frame is R1 mm, a thickness of the film is t1 μm, a Young's modulus of the film is E1 GPa, and a circle equivalent radius of the opening portion is r μm, a parameter A expressed by following Equation (1) is 0.07000 or more and 759.1 or less.

$$A = \sqrt{(E1)} * (t1^{1.2}) * (\ln(r) - e)/(R1^{2.8}) \tag{1}$$

Here, e indicates a Napier's constant, and ln(x) is the logarithm of x with base e.

Assuming that a circle equivalent radius of the frame is R2 m, a thickness of the film is t2 m, a Young's modulus of the film is E2 Pa, and a density of the film is d kg/m³, a parameter B expressed by following Equation (2) is 15.47 or more and 235000 or less.

$$B = t2/R2^2 * \sqrt{(E2/d)} \tag{2}$$

It is preferable that the opening portion of each of the one or more soundproof cells is formed by one hole.

It is preferable that the opening portion of each of the one or more soundproof cells is formed by a plurality of holes having the same size.

In a case where the one or more soundproof cells are a plurality of soundproof cells arranged in a two-dimensional manner, it is preferable that 70% or more of the opening portion of each of the plurality of soundproof cells is formed by a plurality of holes having the same size.

It is preferable that a size of each of the one or more holes of the opening portion of each of the one or more soundproof cells is 2 μm or more.

It is preferable that the average size of the frames of the one or more soundproof cells is equal to or less than a wavelength size corresponding to the shielding peak frequency.

It is preferable that the one or more holes of the opening portion of each of the one or more soundproof cells are holes drilled using a processing method for absorbing energy, and it is preferable that the processing method for absorbing energy is laser processing.

It is preferable that the one or more holes of the opening portion of each of the one or more soundproof cells are holes drilled using a mechanical processing method based on physical contact, and it is preferable that the mechanical processing method is punching or needle processing.

It is preferable that the film is impermeable to air.

It is preferable that one hole of the opening portion of the soundproof cell is provided at a center of the film.

It is preferable that the film is formed of a flexible elastic material.

In a case where the one or more soundproof cells are a plurality of soundproof cells arranged in a two-dimensional manner, it is preferable that the plurality of frames of the plurality of soundproof cells are formed as one frame body arranged so as to be connected in a two-dimensional manner.

In a case where the one or more soundproof cells are a plurality of soundproof cells arranged in a two-dimensional manner, it is preferable that the plurality of films of the plurality of soundproof cells are formed by one sheet-shaped film body that covers the plurality of frames of the plurality of soundproof cells.

In addition, in order to achieve the aforementioned object, a soundproof structure manufacturing method of the present invention comprises: in a case of manufacturing the soundproof structure described above, drilling the one or more holes of the opening portion of each of the one or more soundproof cells in the film of each of the one or more soundproof cells using a processing method for absorbing energy or a mechanical processing method based on physical contact.

It is preferable that the processing method for absorbing energy is laser processing and the mechanical processing method is punching or needle processing.

According to the present invention, it is possible to provide a soundproof structure which is light and thin, in which sound insulation characteristics such as a shielding frequency and a shielding size do not depend on the position and shape of the through-hole, which has high robustness as a sound insulation material and is stable, which has air permeability so that wind and heat can pass therethrough and accordingly has no heat thereinside, which is suitable for equipment, automobiles, and household applications, and which is excellent in manufacturability.

In addition, according to the present invention, it is possible to reliably and easily manufacture such a soundproof structure.

In particular, according to the present invention, any target frequency component can be shielded, that is, reflected and/or absorbed, very strongly by providing a very small hole in a film structure and a film portion of the stiffness law shielding structure of the frame.

According to the present invention, large sound insulation can be performed near 1000 Hz, which is generally difficult to shield with a thin and light structure even with the mass law and the stiffness law and which is a region that can be heard largely by the human ear.

According to the present invention, it is possible to realize a strong sound insulation structure simply by drilling a hole in the film.

According to the present invention, since a weight that causes an increase in the mass is not required for the sound attenuation panel and the structure disclosed in U.S. Pat. No. 7,395,898B (corresponding Japanese Patent Application Publication: JP2005-250474A), it is possible to realize a lighter sound insulation structure.

According to the present invention, since a hole is present, it is possible to realize a structure that shields, that is, reflects and/or absorbs sound while making a film have air permeability, that is, while allowing wind or heat to pass through the film.

According to the present invention, since a hole can be drilled in a film quickly and easily by laser processing or punch hole processing, there is manufacturability.

According to the present invention, since the sound insulation characteristic hardly depends on the position or the shape of a hole, there is an advantage that stability is high in manufacturing.

DESCRIPTION OF THE PREFERRED EMBODIMENTS

Hereinafter, a soundproof structure and a soundproof structure manufacturing method according to the present invention will be described in detail with reference to preferred embodiments shown in the accompanying diagrams.

Figure 1:
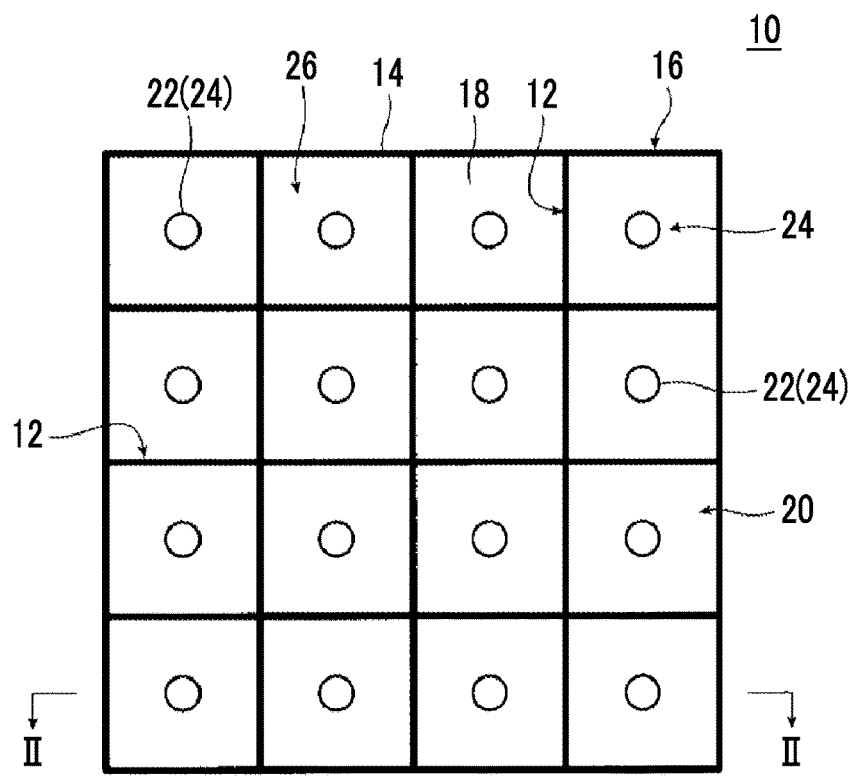
FIG. 1 is a plan view schematically showing an example of a soundproof structure according to an embodiment of the present invention.
Figure 2:
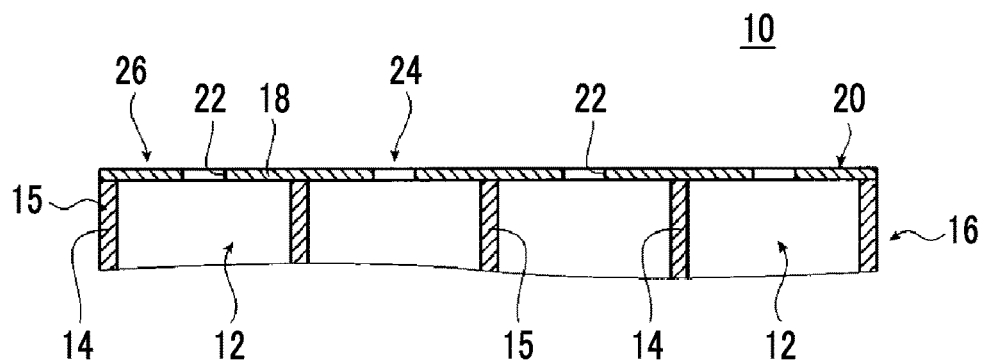
FIG. 2 is a schematic cross-sectional view taken along the line II-II in the soundproof structure shown in FIG. 1.
Figure 3:
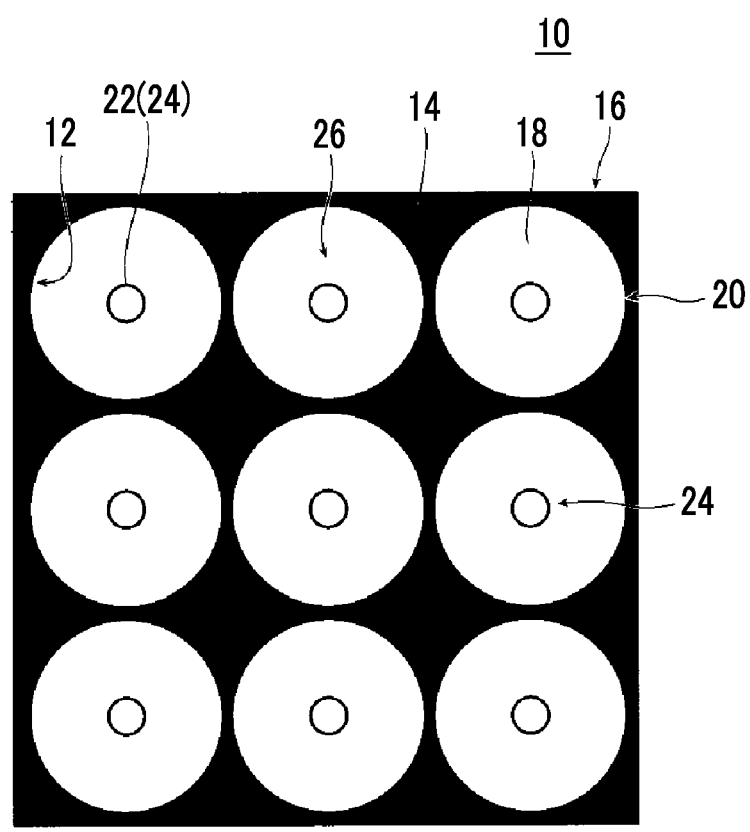
FIG. 3 is a plan view schematically showing an example of a soundproof structure according to another embodiment of the present invention.
Figure 4:
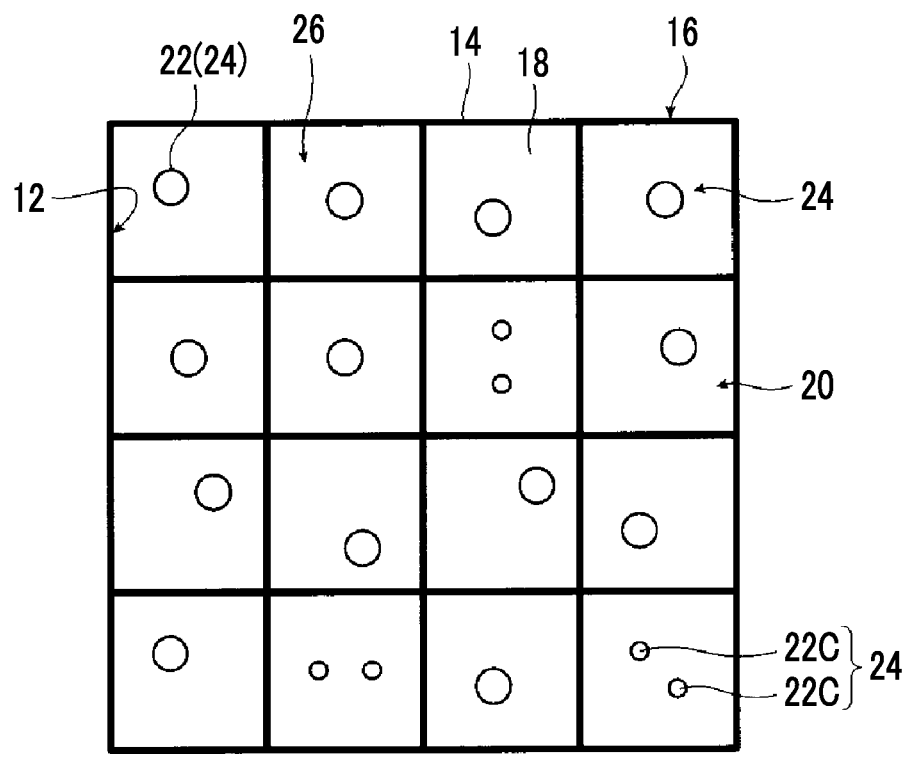
FIG. 4 is a plan view schematically showing an example of a soundproof structure according to another embodiment of the present invention.
Figure 5:
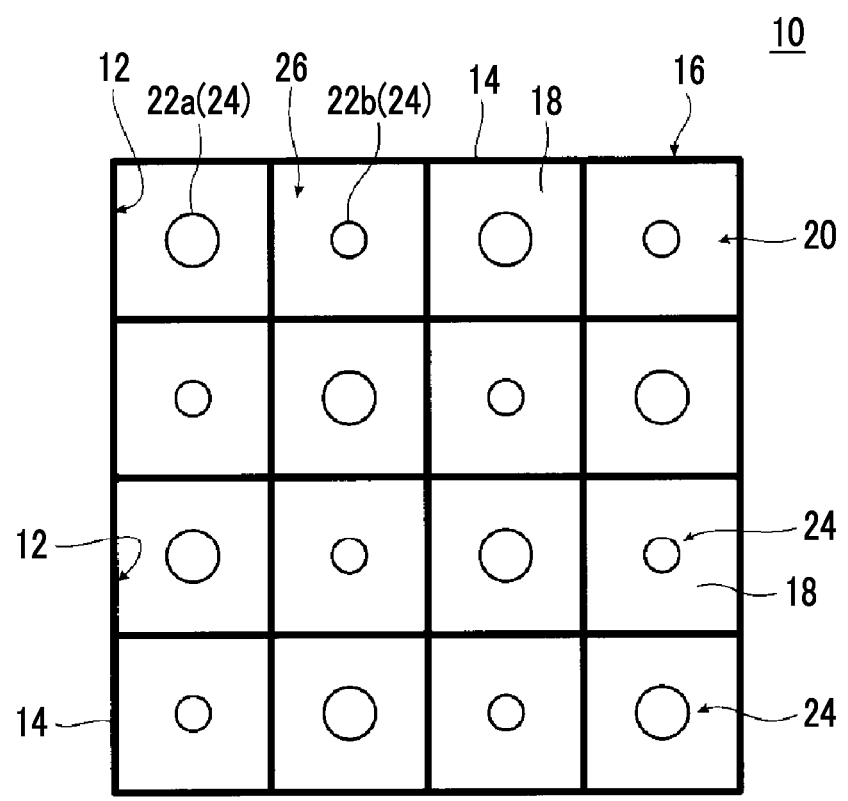
FIG. 5 is a plan view schematically showing an example of a soundproof structure according to another embodiment of the present invention.

FIG. 1 is a plan view schematically showing an example of a soundproof structure according to an embodiment of the present invention, and FIG. 2 is a schematic cross-sectional view taken along the line II-II in the soundproof structure shown in FIG. 1. FIGS. 3 to 5 are plan views schematically showing examples of soundproof structures according to other embodiments of the present invention.

A soundproof structure 10 of the present invention shown in FIGS. 1 and 2 has: a frame body 16 forming a plurality of frames 14 (in the illustrated example, 16 frames 14) each of which has a through-hole 12 and which are arranged in a two-dimensional manner; a sheet-shaped film body 20 forming a plurality of films 18 (in the illustrated example, 16 films 18) which are fixed to the respective frames 14 so as to cover the through-holes 12 of the respective frames 14; and a plurality of opening portions 24 (in the illustrated example, 16 opening portions 24) each of which includes one or more holes 22 (in the illustrated example, one hole 22) drilled so as to penetrate through the film 18 in each frame 14.

In the soundproof structure 10, one frame 14, the film 18 fixed to the frame 14, and the opening portion 24 provided in the film 18 form one soundproof cell 26. Accordingly, the soundproof structure 10 of the present invention is formed by a plurality of soundproof cells 26 (in the illustrated example, 16 soundproof cells 26).

Although the soundproof structure 10 of the illustrated example is formed by a plurality of soundproof cells 26. However, the present invention is not limited thereto, and may be formed by one soundproof cell 26 configured to include one frame 14, one film 18, and one opening portion 24.

Since the frame 14 is formed so as to annularly surround a thick plate-shaped member 15, has the through-hole 12 thereinside, and fixes the film 18 so as to cover the through-hole 12 on at least one side, the frame 14 serves as a node of film vibration of the film 18 fixed to the frame 14. Therefore, the frame 14 has higher stiffness than the film 18. Specifically, both the mass and the stiffness of the frame 14 per unit area need to be high.

It is preferable that the shape of the frame 14 has a closed continuous shape capable of fixing the film 18 so as to restrain the entire outer periphery of the film 18. However, the present invention is not limited thereto, and the frame 14 may be made to have a discontinuous shape by cutting a part thereof as long as the frame 14 serves as a node of film vibration of the film 18 fixed to the frame 14. That is, since the role of the frame 14 is to fix the film 18 to control the film vibration, the effect is achieved even if there are small cuts in the frame 14 or even if there are very slightly unbonded parts.

The geometric form of the through-hole 12 formed by the frame 14 is a planar shape, and is a square shape in the example shown in FIG. 1. In the present invention, however, the geometric form of the through-hole 12 is not particularly limited. For example, the geometric form of the through-hole 12 may be a quadrangle such as a rectangle, a diamond, or a parallelogram, a triangle such as an equilateral triangle, an isosceles triangle, or a right triangle, a polygon including a regular polygon such as a regular pentagon or a regular hexagon, a circular shape shown in FIG. 3, an elliptical shape, and the like, or may be an irregular shape.

The size of the frame 14 is a size in plan view, and can be defined as the size of the through-hole 12. Accordingly, in the following description, the size of the frame 14 is the size of the hole portion 1. However, in the case of a regular polygon such as a square shown in FIGS. 1, 4, and 5 or a circle, the size of the frame 14 can be defined as a distance between opposite sides passing through the center or as a circle equivalent diameter. In the case of a polygon, an ellipse, or an irregular shape, the size of the frame 14 can be defined as a circle equivalent diameter. In the present invention, the circle equivalent diameter and the radius are a diameter and a radius at the time of conversion into circles having the same area.

In the soundproof structure 10 according to the present invention, the size of the frame 14 may be fixed in all frames 14. However, frames having different sizes (including a case where shapes are different) may be included. In this case, the average size of the frames 14 may be used as the size of the frame 14.

The size of the frame 14 is not particularly limited, and may be set according to a soundproofing target to which the soundproof structure 10 of the present invention is applied, for example, a copying machine, a blower, air conditioning equipment, a ventilator, a pump, a generator, a duct, industrial equipment including various kinds of manufacturing equipment capable of emitting sound such as a coating machine, a rotary machine, and a conveyor machine, transportation equipment such as an automobile, a train, and aircraft, and general household equipment such as a refrigerator, a washing machine, a dryer, a television, a copying machine, a microwave oven, a game machine, an air conditioner, a fan, a PC, a vacuum cleaner, and an air purifier.

The soundproof structure 10 itself can be used like a partition in order to shield sound from a plurality of noise sources. Also in this case, the size of the frame 14 can be selected from the frequency of the target noise.

Although the details will be described later, it is preferable to reduce the size of the frame 14 in order to obtain the natural vibration mode of the structure configured to include the frame 14 and the film 18 on the high frequency side.

In addition, although the details will be described later, in order to prevent sound leakage due to diffraction at the shielding peak of the soundproof cell 26 due to the opening portion 24 that is provided in the film 18 and is configured to include holes, it is preferable that the average size of the frame 14 is equal to or less than the wavelength size corresponding to a shielding peak frequency to be described later.

For example, the size of the frame 14 is preferably 0.5 mm to 200 mm, more preferably 1 mm to 100 mm, and most preferably 2 mm to 30 mm.

The size of the frame 14 is preferably expressed by an average size, for example, in a case where different sizes are included in each frame 14.

In addition, the width and the thickness of the frame 14 are not particularly limited as long, as the film 18 can be fixed so as to be reliably restrained and accordingly the film 18 can be reliably supported. For example, the width and the thickness of the frame 14 can be set according to the size of the frame 14.

For example, in a case where the size of the frame 14 is 0.5 mm to 50 mm, the width W of the frame 14 is preferably 0.5 mm to 20 mm, more preferably 0.7 mm to 10 mm, and most preferably 1 mm to 5 mm.

If the ratio of the width of the frame 14 to the size of the frame 14 is too large, the area ratio of the frame 14 with respect to the entire structure increases. Accordingly, there is a concern that the device will become heavy. On the other hand, if the ratio is too small, it is difficult to strongly fix the film with an adhesive or the like in the frame 14 portion.

In a case where the size of the frame 14 exceeds 50 mm and is equal to or less than 200 mm, the width W of the frame 14 is preferably 1 mm to 100 mm, more preferably 3 mm to 50 mm, and most preferably 5 mm to 20 mm.

In addition, the thickness of the frame 14 is preferably 0.5 mm to 200 mm, more preferably 0.7 mm to 100 mm, and most preferably 1 mm to 50 mm.

It is preferable that the width and the thickness of the frame 14 are expressed by an average width and an average thickness, for example, in a case where different widths and thicknesses are included in each frame 14.

In addition, in the present invention, it is preferable that a plurality of frames 14, that is, two or more frames 14 are forming as the frame body 16 arranged so as to be connected in a two-dimensional manner.

Here, the number of frames 14 of the soundproof structure 10 of the present invention, that is, the number of frames 14 forming the frame body 16 in the illustrated example, is not particularly limited, and may be set according to the above-described soundproofing target of the soundproof structure 10 of the present invention. Alternatively, since the size of the frame 14 described above is set according to the above-described soundproofing target, the number of frames 14 may be set according to the size of the frame 14.

For example, in the case of in-device noise shielding (reflection and/or absorption), the number of frames 14 is preferably 1 to 10000, more preferably 2 to 5000, and most preferably 4 to 1000.

The reason is as follows. For the size of general equipment, the size of the equipment is fixed. Accordingly, in order to make the size of one soundproof cell 26 suitable for the frequency of noise, it is often necessary to perform shielding (reflection and/or absorption) with the frame body 16 obtained by combining a plurality of soundproof cells 26. In addition, by increasing the number of soundproof cells 26 too much, the total weight is increased by the weight of the frame 14. On the other hand, in a structure such as a partition that is not limited in size, it is possible to freely select the number of frames 14 according to the required overall size.

In addition, since one soundproof cell 26 has one frame 14 as a constitutional unit, the number of frames 14 of the soundproof structure 10 of the present invention can be said to be the number of soundproof cells 26.

The material of the frame 14, that is, the material of the frame body 16, is not particularly limited as long as the material can support the film 18, has a suitable strength in a case of being applied to the above soundproofing target, and is resistant to the soundproof environment of the soundproofing target, and can be selected according to the soundproofing target and the soundproof environment. For example, as materials of the frame 14, metal materials such as aluminum, titanium, magnesium, tungsten, iron, steel, chromium, chromium molybdenum, nichrome molybdenum, and alloys thereof, resin materials such as acrylic resins, polymethyl methacrylate, polycarbonate, polyamidimide, polyarylate, polyether imide, polyacetal, polyether ether ketone, polyphenylene sulfide, polysulfone, polyethylene terephthalate, polybutylene terephthalate, polyimide, and triacetyl cellulose, carbon fiber reinforced plastic (CFRP), carbon fiber, and glass fiber reinforced plastic (GFRP) can be mentioned.

A plurality of materials of the frame 14 may be used in combination.

Since the film 18 is fixed so as to be restrained by the frame 14 so as to cover the through-hole 12 inside the frame 14, the film 18 vibrates in response to sound waves from the outside. By absorbing or reflecting the energy of sound waves, the sound is insulated. For this reason, it is preferable that the film 18 is impermeable to air.

Incidentally, since the film 18 needs to vibrate with the frame 14 as a node, it is necessary that the film 18 is fixed to the frame 14 so as to be reliably restrained by the frame 14 and accordingly becomes an antinode of film vibration, thereby absorbing or reflecting the energy of sound waves to insulate sound. For this reason, it is preferable that the film 18 is formed of a flexible elastic material.

Therefore, the shape of the film 18 is the shape of the through-hole 12 of the frame 14. In addition, the size of the film 18 is the size of the frame 14. More specifically, the size of the film 18 can be said to be the size of the through-hole 12 of the frame 14.

Figure 6:
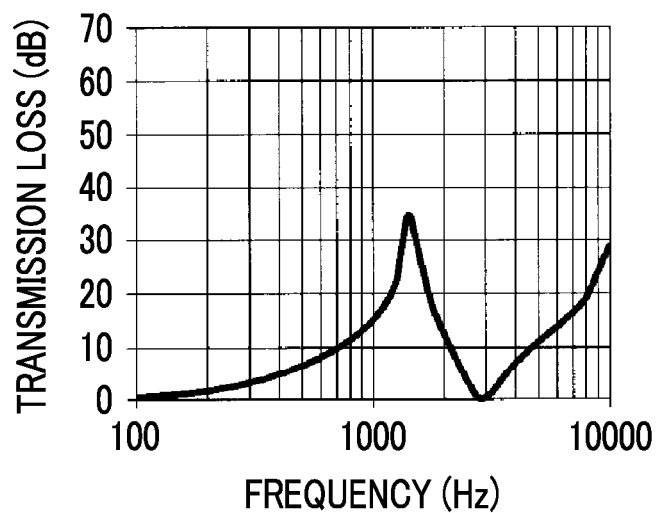
FIG. 6 is a graph showing a sound insulation characteristic represented by a transmission loss with respect to a frequency of a soundproof structure of Example 1 of the present invention.
Figure 7:
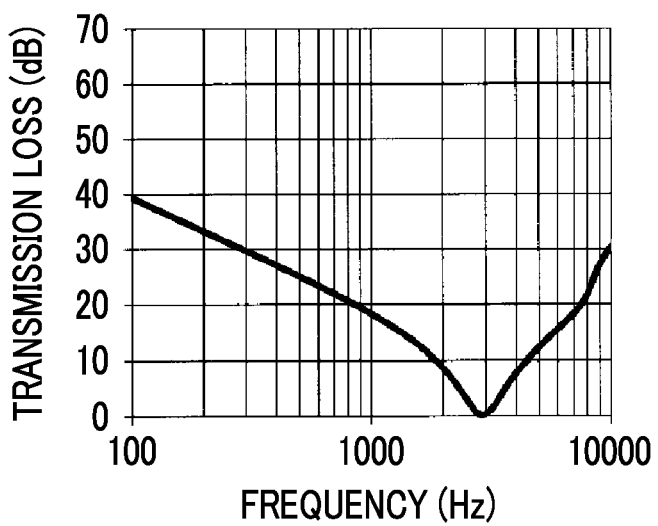
FIG. 7 is a graph showing a sound insulation characteristic of a soundproof structure of Comparative Example 1.

Here, as shown in FIGS. 6 to 11, the film 18 fixed to the frame 14 of the soundproof cell 26 has a first natural vibration frequency (a first mode resonant frequency) at which the transmission loss is minimum, for example 0 dB, as a resonance frequency that is a frequency of the lowest order natural vibration mode. In the present invention, the first natural vibration frequency is determined by the structure configured to include the frame 14 and the film 18. Therefore, as shown in FIGS. 6 and 7, the present inventors have found that the first natural vibration frequency becomes approximately the same value regardless of the presence or absence of the hole 22 drilled in the film 18, and accordingly, the opening portion 24. FIGS. 6 to 11 are graphs showing the sound insulation characteristics of the soundproof structures of Example 1 and Comparative Example 1 of the present invention and Examples 10, 21, 5, 23, and 38 of the present invention, which will be described later, and show transmission loss with respect to the frequency.

Here, the first natural vibration frequency of the film 18, which is fixed so as to be restrained by the frame 14, in the structure configured to include the frame 14 and the film 18 is the frequency of the natural vibration mode at which the sound wave most vibrates the film vibration due to the resonance phenomenon. The sound wave is largely transmitted at the frequency.

According to the finding of the present inventors, in the soundproof structure 10 of the present invention, the hole 22 forming the opening portion 24, is drilled in the film 18 as a through-hole. Therefore, a shielding peak of the sound wave whose transmission loss is a peak (maximum) appears at the shielding peak frequency on the lower frequency side than the first natural vibration frequency. In particular, on the lower frequency side than the peak of shielding caused by the through-hole 22, an increase in sound absorption due to the presence of the through-hole 22 appears.

Accordingly, in the soundproof structure 10 of the present invention, the shielding (transmission loss) becomes a peak (maximum) at the shielding peak frequency. As a result, it is possible to selectively insulate sound in a certain frequency band having the shielding peak frequency at its center.

In the present invention, first, it is possible to increase the shielding of sound and to control the peak of shielding. In addition to these features, there is a feature that the absorption of sound (energy of sound waves) appears on the lower frequency side due to the effect of the through-hole 22.

For example, in the example shown in FIG. 6, the first natural vibration frequency is 2820 Hz in the audible range, and the peak of shielding at which the transmission loss is a peak value of 35 dB is shown at 1412 Hz that is a shielding peak frequency on the lower frequency side. Therefore, it is possible to selectively insulate sound in a predetermined frequency band having 1412 Hz in the audible range at its center.

Also in each of the examples shown in FIGS. 8 to 11, For the first natural vibration frequency of 5620 Hz, 2818 Hz, 2820 Hz, and 2820 Hz in the audible range, the transmission loss is 40, 72, 29 and 37, and 70 at the shielding peak frequencies of 3162 Hz, 708 Hz, 2000 Hz, and 1258 Hz on the low frequency side and in the audible range. Therefore, these show that it is possible to selectively insulate sound in a predetermined frequency band having each shielding peak frequency at its center.

In addition, a method of measuring the transmission loss (dB) in the soundproof structure of the present invention will be described later.

Therefore, in order to set the shielding peak frequency depending on the opening portion 24 configured to include one or more holes 22 to an arbitrary frequency within the audible range in the structure configured to include the frame 14 and the film 18, it is important to obtain the natural vibration mode on the high frequency side if possible. In particular, this is practically important. For this reason, it is preferable to make the film 18 thick, it is preferable to increase the Young's modulus of the material of the film 18, and it is preferable to reduce the size of the frame 14, accordingly, the size of the film 18 as described above. That is, in the present invention, these preferable conditions are important.

Therefore, since the soundproof structure 10 of the present invention complies with the stiffness law. In order to shield sound waves at frequencies lower than the first natural vibration frequency of the film 18 fixed to the frame 14, the first natural vibration frequency of the film 18 is preferably 10 Hz to 100000 Hz corresponding to the sound wave sensing range of a human being, more preferably 20 Hz to 20000 Hz that is the audible range of sound waves of a human being, even more preferably 40 Hz to 16000 Hz, most preferably 100 Hz to 12000 Hz.

The thickness of the film 18 is not particularly limited as long as the film can vibrate by absorbing or reflecting the energy of sound waves to insulate sound. However, it is preferable to make the film 18 thick in order to obtain a natural vibration mode on the high frequency side. For example, the thickness of the film 18 can be set according to the size of the frame 14, that is, the size of the film in the present invention.

For example, in a case where the size of the frame 14 is 0.5 mm to 50 mm, the thickness of the film 18 is preferably 0.005 mm (5 µm) to 5 mm, more preferably 0.007 mm (7 µm) to 2 mm, and most preferably 0.01 mm (10 µm) to 1 mm.

In a case where the size of the frame 14 exceeds 50 mm and is equal to or less than 200 mm, the thickness of the film 18 is preferably 0.01 mm (10 µm) to 20 mm, more preferably 0.02 mm (20 µm) to 10 mm, and most preferably 0.05 mm (50 µm) to 5 mm.

The thickness of the film 18 is preferably expressed by an average thickness, for example, in a case where the thickness of one film 18 is different or in a case where different thicknesses are included in each film 18.

In the soundproof structure 10 of the present invention, the first natural vibration frequency of the film 18 in the structure configured to include the frame 14 and the film 18 can be determined by the geometric form of the frame 14 of a plurality of soundproof cells 26, for example, the shape and size of the frame 14, and the stiffness of the film of the plurality of soundproof cells, for example, thickness and flexibility of the film.

As a parameter characterizing the first natural vibration mode of the film 18, in the case of the film 18 of the same material, a ratio between the thickness (t) of the film 18 and the square of the size (a) of the frame 14 can be used. For example, in the case of a square, a ratio $[a^2/t]$ between the size of one side and the square of the size (a) of the frame 14 can be used. In a case where the ratio $[a^2/t]$ is the same, for example, in a case where (t, a) is (50 µm, 7.5 mm) and a case where (t, a) is (200 µm, 15 mm), the first natural vibration mode is the same frequency, that is, the same first natural vibration frequency. That is, by setting the ratio $[a^2/t]$ to a fixed value, the scale law is established. Accordingly, an appropriate size can be selected.

The Young's modulus of the film 18 is not particularly limited as long as the film has elasticity capable of vibrating in order to insulate sound by absorbing or reflecting the energy of sound waves. However, it is preferable to set the Young's modulus of the film 18 to be large in order to obtain a natural vibration mode on the high frequency side. For example, the Young's modulus of the film 18 can be set according to the size of the frame 14, that is, the size of the film in the present invention.

For example, the Young's modulus of the film 18 is preferably 1000 Pa to 3000 GPa, more preferably 10000 Pa to 2000 GPa, and most preferably 1 MPa to 1000 GPa.

The density of the film 18 is not particularly limited either as long as the film can vibrate by absorbing or reflecting the energy of sound waves to insulate sound. For example, the density of the film 18 is preferably 10 kg/m$^3$ to 30000 kg/m$^3$, more preferably 100 kg/m$^3$ to 20000 kg/m$^3$, and most preferably 500 kg/m$^3$ to 10000 kg/m$^3$.

In a case where a film-shaped material or a foil-shaped material is used as a material of the film 18, the material of the film 18 is not particularly limited as long as the material has a strength in a case of being applied to the above soundproofing target and is resistant to the soundproof environment of the soundproofing object so that the film 18 can vibrate by absorbing or reflecting the energy of sound waves to insulate sound, and can be selected according to the soundproofing target, the soundproof environment, and the like. Examples of the material of the film 18 include resin materials that can be made into a film shape such as polyethylene terephthalate (PET), polyimide, polymethylmethacrylate, polycarbonate, acrylic (PMMA), polyamidimide, polyarylate, polyetherimide, polyacetal, polyetheretherketone, polyphenylene sulfide, polysulfone, polybutylene terephthalate, polyimide, triacetyl cellulose, polyvinylidene chloride, low density polyethylene, high density polyethylene, aromatic polyamide, silicone resin, ethylene ethyl acrylate, vinyl acetate copolymer, polyethylene, chlorinated polyethylene, polyvinyl chloride, polymethyl pentene, and polybutene, metal materials that can be made into a foil shape such as aluminum, chromium, titanium, stainless steel, nickel, tin, niobium, tantalum, molybdenum, zirconium, gold, silver, platinum, palladium, iron, copper, and permalloy, fibrous materials such as paper and cellulose, and materials or structures capable of forming a thin structure such as a nonwoven fabric, a film containing nano-sized fiber, porous materials including thinly processed urethane or synthrate, and carbon materials processed into a thin film structure.

The film 18 may be individually fixed to each of the plurality of frames 14 of the frame body 16 of the soundproof structure 10 to form the sheet-shaped film body 20 as a whole. Conversely, the film 18 covering each frame 14 may be formed by one sheet-shaped film body 20 fixed so as to cover all the frames 14. Alternatively, the film 18 covering each frame 14 may be formed by fixing a sheet-shaped film body to a part of the frame 14 so as to cover some of the plurality of frames 14, and the sheet-shaped film body 20 covering all of the plurality of frames 14 (all frames 14) may be formed by using some of these sheet-shaped film bodies.

In addition, the film 18 is fixed to the frame 14 so as to cover an opening on at least one side of the through-hole 12 of the frame 14. That is, the film 18 may be fixed to the frame 14 so as to cover openings on one side, the other side, or both sides of the through-hole 12 of the frame 14.

Here, all the films 18 may be provided on the same side of the through-holes 12 of the plurality of frames 14 of the soundproof structure 10. Alternatively, some of the films 18 may be provided on one side of each of some of the through-holes 12 of the plurality of frames 14, and the remaining films 18 may be provided on the other side of each of the remaining some through-holes 12 of the plurality of frames 14. Furthermore, films provided on one side, the other side, and both sides of the through-holes 12 of the frame 14 may be mixed.

The method of fixing the film 18 to the frame 14 is not particularly limited. Any method may be used as long as the film 18 can be fixed to the frame 14 so as to serve as a node of film vibration. For example, a method using an adhesive, a method using a physical fixture, and the like can be mentioned.

In the method of using an adhesive, an adhesive is applied onto the surface of the frame 14 surrounding the through-hole 12 and the film 18 is placed thereon, so that the film 18 is fixed to the frame 14 with the adhesive. Examples of the adhesive include epoxy-based adhesives (Araldite and the like), cyanoacrylate-based adhesives (Aron Alpha and the like), acrylic-based adhesives, and the like.

As a method using a physical fixture, a method can be mentioned in which the film 18 disposed so as to cover the through-hole 12 of the frame 14 is interposed between the frame 14 and a fixing member, such as a rod, and the fixing member is fixed to the frame 14 by using a fixture, such as a screw.

In the film 18, that is, in the soundproof cell 26, the opening portion 24 configured to include one or more holes 22 is provided.

In the present invention, as shown in FIGS. 6 and 8 to 11, the soundproof structure 10 has the opening portion 24 configured to include of one or more holes 22 drilled in the film 18. Accordingly, the soundproof structure 10 has a peak of transmission loss, at which shielding is a peak (maximum), on the lower frequency side than the first natural vibration frequency of the film 18, and the frequency at which the shielding (transmission loss) is a peak (maximum) is called a shielding peak frequency.

The shielding peak frequency appears due to the hole 22 of the opening portion 24 on the lower frequency side than the first natural vibration frequency that mainly depends on the film 18 of the soundproof cell 26 of the soundproof structure 10. The shielding peak frequency is determined according to the size of the opening portion 24 with respect to the size of the frame 14 (or the film 18), specifically, the opening ratio of the opening portion 24 that is the ratio of the total area of the hole 22 to the area of the through-hole 12 (or the film 18 that covers the through-hole 12) of the frame 14.

Here, as shown in FIG. 4, one or more holes 22 may be drilled in the film 18 that covers the through-hole 12 of the soundproof cell 26. As shown in FIGS. 1 to 3 and 5, the drilling position of the hole 22 may be the middle of the soundproof cell 26 or the film 18 (hereinafter, represented by the soundproof cell 26). However, the present invention is not limited thereto, the drilling position of the hole 22 does not need to be the middle of the soundproof cell 26, and the hole 22 may be drilled at any position as shown in FIG. 4.

That is, the sound insulation characteristic of the soundproof structure 10 of the present invention is not changed simply by changing the drilling position of the hole 22.

As shown in FIGS. 1 to 3 and 5, the number of holes 22 forming the opening portion 24 in the soundproof cell 26 may be one for one soundproof cell 26. However, the present invention is not limited thereto, and two or more (that is, a plurality of) holes 22 may be provided as shown in FIG. 4.

In the soundproof structure 10 of the present invention, from the viewpoint of air permeability, as shown in FIGS. 1 to 3 and 5, it is preferable that the opening portion 24 of each soundproof cell 26 is formed by one hole 22. The reason is that, in the case of a fixed opening ratio, the easiness of passage of air as wind is large in a case where one hole is large and the viscosity at the boundary does not work greatly.

On the other hand, in a case where there is a plurality of holes 22 in one soundproof cell 26, the sound insulation characteristic of the soundproof structure 10 of the present invention indicates a sound insulation characteristic corresponding to the total area of the plurality of holes 22, that is, the area of the opening portion 24. That is, the sound insulation characteristic of the soundproof structure 10 of the present invention indicates a corresponding sound insulation peak at the corresponding sound insulation peak frequency. Therefore, as shown in FIG. 4, it is preferable that the area of the opening portion 24, which is the total area of the plurality of holes 22 in one soundproof cell 26 (or the film 18) is equal to the area of the opening portion 24, which is the area of one hole 22 that is only provided in another soundproof cell 26 (or the film 18). However, the present invention is not limited thereto.

In a case where the opening ratio of the opening portion 24 in the soundproof cell 26 (the area ratio of the opening portion 24 to the area of the film 18 covering the through-hole 12 (the ratio of the total area of all the holes 22)) is the same, the same soundproof structure 10 is obtained with the single hole 22 and the plurality of holes 22. Accordingly, even if the size of the hole 22 is fixed to any size, it is possible to manufacture soundproof structures corresponding to various frequency bands.

In the present invention, the opening ratio (area ratio) of the opening portion 24 in the soundproof cell 26 is not particularly limited, and may be set according to the sound insulation frequency band to be selectively insulated. The opening ratio (area ratio) of the opening portion 24 in the soundproof cell 26 is preferably 0.000001% to 70%, more preferably 0.000005% to 50%, and most preferably 0.00001% to 30%. By setting the opening ratio of the opening portion 24 within the above range, it is possible to determine the sound insulation peak frequency, which is the center of the sound insulation frequency band to be selectively insulated, and the transmission loss at the sound insulation peak.

From the viewpoint of manufacturability, it is preferable that the soundproof structure 10 of the present invention has a plurality of holes 22 of the same size in one soundproof cell 26. That is, it is preferable that the opening portion 24 of soundproof cell 26 is configured to include a plurality of holes 22 of the same size.

In the soundproof structure 10 of the present invention, it is preferable that the holes 22 forming, the opening portions 24 of all the soundproof cells 26 have the same size.

In the present invention, it is preferable that the hole 22 is drilled using a processing method for absorbing energy, for example, laser processing, or it is preferable that the hole 22 is drilled using a mechanical processing method based on physical contact, for example, punching or needle processing.

Therefore, if a plurality of holes 22 in one soundproof cell 26 or one or a plurality of holes 22 in all the soundproof cells 26 are made to have the same size, in the case of drilling holes by laser processing, punching, or needle processing, it is possible to continuously drill holes without changing the setting of a processing apparatus or the processing strength.

In addition, as shown in FIG. 5, in the soundproof structure 10 of the present invention, the size of the hole 22 in the soundproof cell 26 (or the film 18) may be different for each soundproof cell 26 (or the film 18). In a case where there are holes 22 having different sizes for each soundproof cell 26 (or the film 18) as described above, a sound insulation characteristic corresponding to the average area of the areas of the holes 22, that is, a corresponding sound insulation peak at the corresponding sound insulation peak frequency is shown.

In addition, it is preferable that 70% or more of the opening portion 24 of each soundproof cell 26 of the soundproof structure 10 of the present invention is formed by holes having the same size.

The size of the hole 22 forming the opening portion 24 may be any size as long as the hole 22 can be appropriately drilled by the above-described processing method, and is not particularly limited.

However, from the viewpoint of processing accuracy of laser processing such as accuracy of laser diaphragm, processing accuracy of punching or needle processing, manufacturability such as easiness of processing, and the like, the size of the hole 22 on the lower limit side thereof is preferably 2 μm or more, more preferably 5 μm or more, and most preferably 10 μm or more.

The upper limit of the size of the hole 22 needs to be smaller than the size of the frame 14. Therefore, normally, if the size of the frame 14 is set to the order of mm and the size of the hole 22 is set to the order of μm, the upper limit of the size of the hole 22 does not exceed the size of the frame 14. In a case where the upper limit of the size of the hole 22 exceeds the size of the frame 14, the upper limit of the size of the hole 22 may be set to be equal to or less than the size of the frame 14.

Incidentally, in the soundproof structure 10 of the present invention, the first natural vibration frequency is determined by the structure configured to include the frame 14 and the film 18, and the shielding peak frequency at which the transmission loss reaches its peak is determined depending on the opening portion formed by the holes 22 drilled in the film of the structure configured to include the frame 14 and the film 18.

Figure 12:
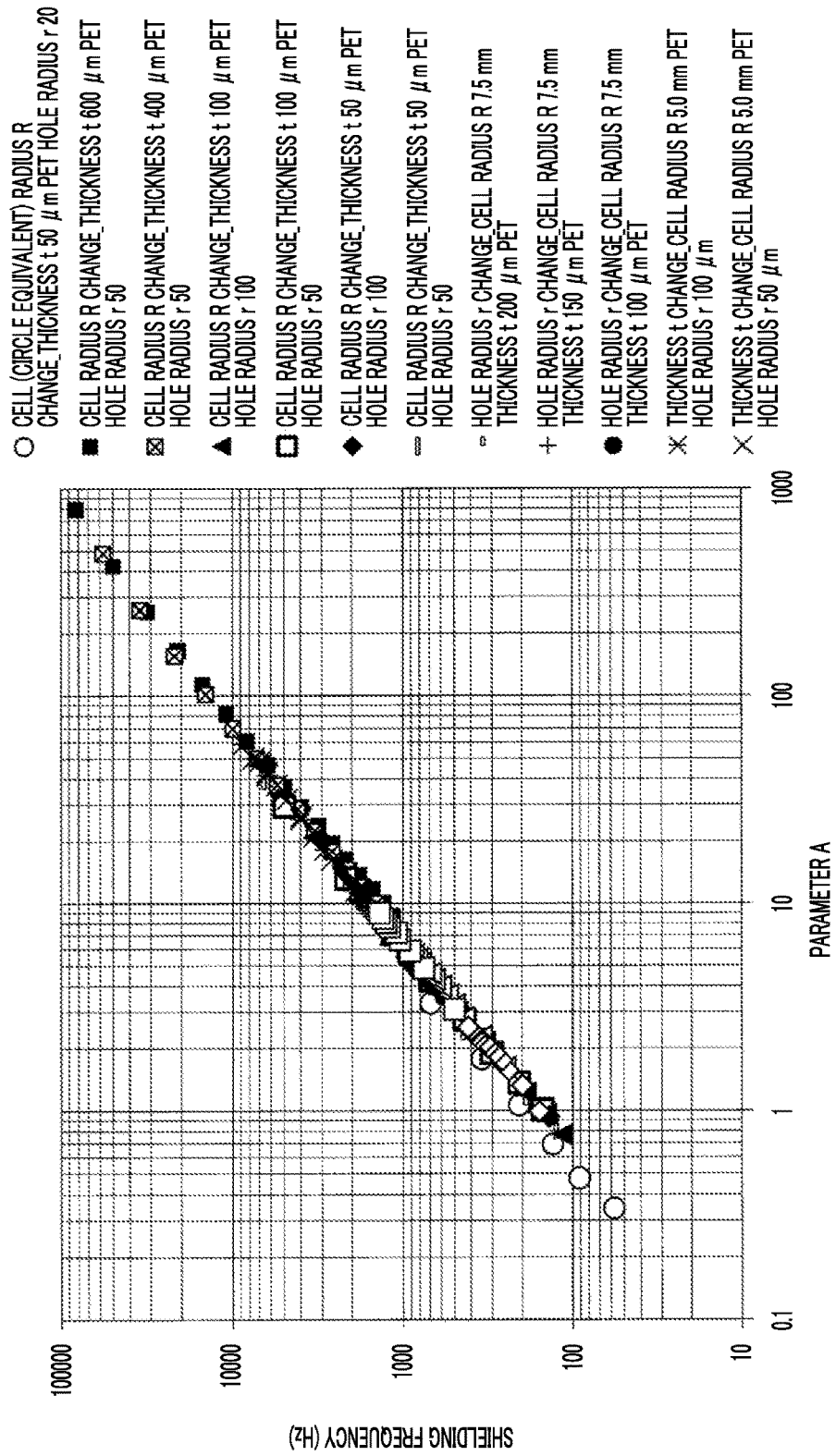
FIG. 12 is a graph showing a shielding frequency with respect to a parameter A of the soundproof structure of the present invention.

Here, in the soundproof structure 10 of the present invention, the present inventors have found that, assuming that the circle equivalent radius of the soundproof cell 26, that is, the frame 14 is R1 mm, the thickness of the film 18 is t1 μm, the Young's modulus of the film 18 is E1 GPa, and the circle equivalent radius of the opening portion 24 is r μm, the parameter A expressed by Equation (1) and the shielding peak vibration frequency (Hz) of the soundproof structure 10 have a substantially linear relationship, are expressed by a substantially linear equation, and are present on substantially the same straight line on the two-dimensional coordinates as shown in FIG. 12 even in a case where the circle equivalent radius R1 mm of the soundproof cell 26, the thickness t1 μm of the film 18, the Young's modulus E1 GPa of the film 18, and the circle equivalent radius r μm of the opening portion 24 are changed. It has also been found that the parameter A does not substantially depend on the density of the film or the Poisson's ratio.

$$A=\sqrt{(E1)}*(t1^{1.2})*(\ln(r)-e)/(R1^{2.8}) \tag{1}$$

Here, e is a Napier's constant, and ln(x) is the logarithm of x with base e.

Here, it is assumed that, in a case where a plurality of opening portions 24 are present in the soundproof cell 26, the circle equivalent radius r is calculated from the total area of a plurality of opening portions.

In addition, FIG. 12 is obtained from the simulation result at the design stage before the experiment of an example to be described later.

In the soundproof structure 10 of the present invention, in a case where the first natural vibration frequency is set to 10 Hz to 100000 Hz, the shielding peak vibration frequency is the main fraction equal to or lower than the first natural vibration frequency. Accordingly, Table 1 shows the values of the parameter A corresponding to a plurality of values of the shielding peak vibration frequency from 10 Hz to 100000 Hz.

TABLE 1

| Frequency (Hz) | A parameter |
|---|---|
| 10 | 0.07000 |
| 20 | 0.1410 |
| 40 | 0.2820 |
| 100 | 0.7050 |
| 12000 | 91.09 |
| 16000 | 121.5 |
| 20000 | 151.8 |
| 100000 | 759.1 |

As is apparent from Table 1, the parameter A corresponds to the first natural vibration frequency. Therefore, in the present invention, the parameter A is preferably 0.07000 to 759.1, more preferably 0.1410 to 151.82, even more preferably 0.2820 to 121.5, most preferably 0.7050 to 91.09.

By using the parameter A standardized as described above, the shielding peak frequency can be determined in the soundproof structure of the present invention, and the sound in a predetermined frequency band having the shielding peak frequency at its center can be selectively insulated. Conversely, by using the parameter A, it is possible to set the soundproof structure of the present invention having the shielding peak frequency that is the center of the frequency band to be selectively insulated.

Figure 13:
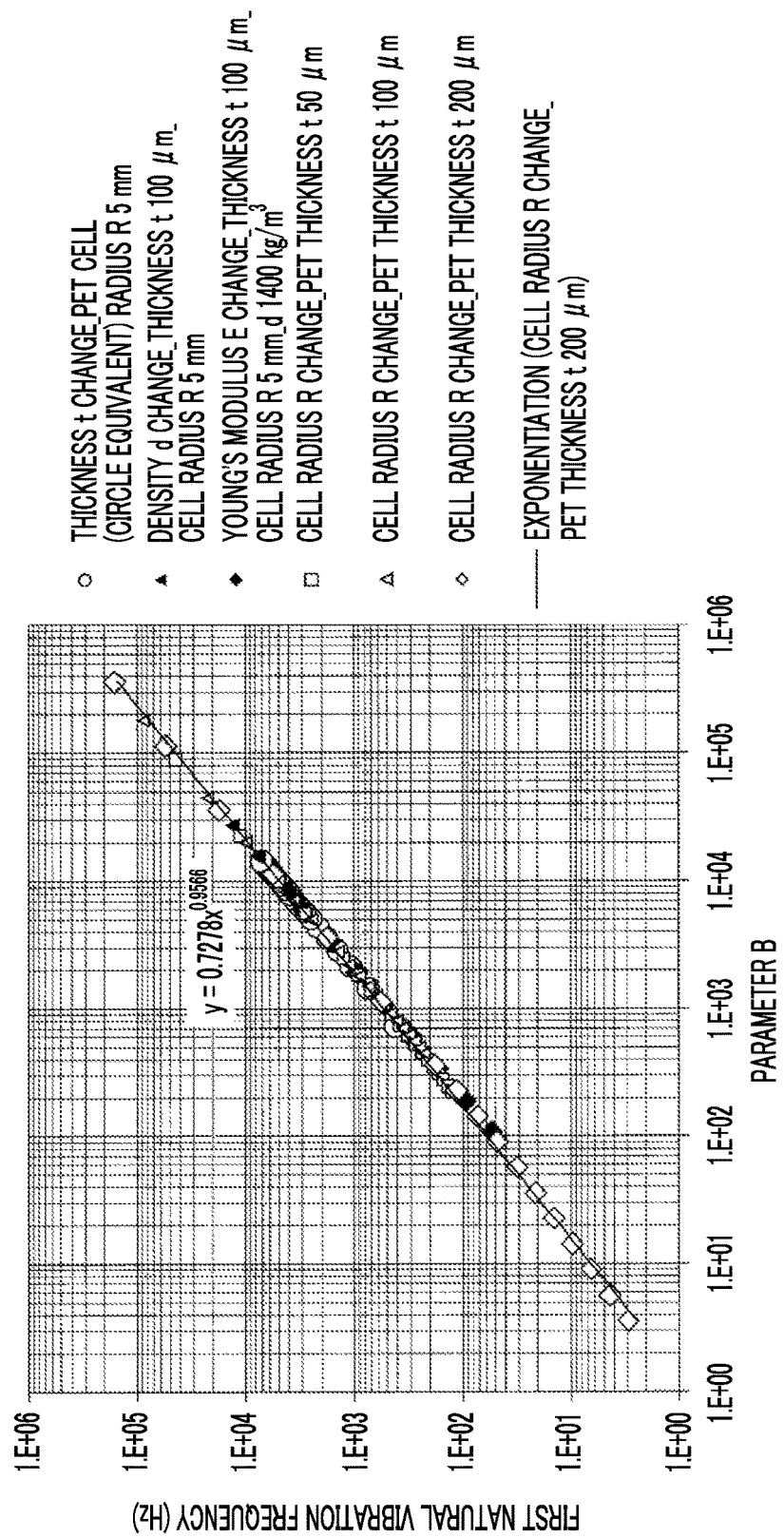
FIG. 13 is a graph showing a first natural vibration frequency with respect to a parameter B of the soundproof structure of the present invention.

In addition, in the soundproof structure 10 of the present invention, the present inventors have found that, assuming that the circle equivalent radius of the soundproof cell 26, that is, the frame 14 is R2 m, the thickness of the film 18 is t2 m, the Young's modulus of the film 18 is E2 Pa, and the density of the film 18 is d kg/m³, the parameter B (√m) expressed by Equation (2) and the first natural vibration frequency (Hz) of the structure configured to include the frame 14 and the film 18 of the soundproof structure 10 have a substantially linear relationship and are expressed by Equation (3) as shown in FIG. 13 even in a case where the circle equivalent radius R2 m of the soundproof cell 26, the thickness t2 m of the film 18, the Young's modulus E2 Pa of the film 18, and the density d kg/m³ of the film 18 are changed.

$$B=t2/R2^{2}*\sqrt{(E2/d)} \tag{2}$$

$$y=0.7278x^{0.9666} \tag{3}$$

Here, y is the first natural vibration frequency (Hz), and x is the parameter B.

In addition, FIG. 13 is obtained from the simulation result at the design stage before the experiment of an example to be described later.

From the above, in the soundproof structure 10 of the present invention, by standardizing the circle equivalent radius R2 m of the soundproof cell 26, the thickness t2 m of the film 18, the Young's modulus E2 Pa of the film 18, and the density d kg/m$^3$ of the film 18 with the parameter B ($\sqrt{}$m), a point representing the relationship between the parameter B and the first natural vibration frequency (Hz) of the soundproof structure 10 on the two-dimensional (xy) coordinates is expressed by the above Equation (3) regarded as a substantially linear equation. Therefore, it can be seen that all points are on substantially the same straight line. In addition, both R2 and R1 represent the circle equivalent radius of the soundproof cell 26, but there is a relationship of R2=10$^3$× R1. In addition, both t2 and t1 represent the thickness of the film 18, but there is a relationship of t2=10$^6$×t1. In addition, both E2 and E1 represent the Young's modulus of the film 18, but there is a relationship of E1=10$^9$×E2.

Table 2 shows the values of the parameter B corresponding to a plurality of values of the first natural vibration frequency from 10 Hz to 100000 Hz.

TABLE 2

| Frequency (Hz) | B parameter |
|---|---|
| 10 | 1.547 × 10 |
| 20 | 3.194 × 10 |
| 40 | 6.592 × 10 |
| 100 | 1.718 × 10$^2$ |
| 12000 | 2.562 × 10$^4$ |
| 16000 | 3.460 × 10$^4$ |
| 20000 | 4.369 × 10$^4$ |
| 100000 | 2.350 × 10$^5$ |

As is apparent from Table 2, the parameter B corresponds to the first natural vibration frequency. Therefore, in the present invention, the parameter B is preferably 1.547×10 (=15.47) to 2.350×10$^5$ (=235000), more preferably 3.194× 10 (=31.94) to 4.369×10$^4$ (=43690), even more preferably 6.592×10 (=65.92) to 3.460×10$^4$ (=34600), and most preferably 1.718×10$^2$ (=171.8) to 2.562×10$^4$ (=25620).

By using the parameter B standardized as described above, the first natural vibration frequency that is an upper limit on the high frequency side of the shielding peak frequency in the soundproof structure of the present invention can be determined, and the shielding peak frequency that is the center of the frequency band to be selectively insulated can be determined. Conversely, by using the parameter B, it is possible to set the soundproof structure of the present invention having a first natural vibration frequency that can have a shielding peak frequency that is the center of the frequency band to be selectively insulated.

In the sound insulation of the soundproof structure of the present invention, it is important that both the through-hole 22, through which sound can pass as an acoustic wave rather than vibration, and the film 18 as a vibration film, through which sound passes, are present.

Therefore, even in a state in which the through-hole 22 through which sound can pass is covered with a member allowing sound to pass therethrough as an acoustic wave traveling through the air rather than as a film vibration, it is possible to obtain a peak of sound insulation similarly to a case where the through-hole 22 is open. Such a member is a generally permeable member.

As a representative member having such air permeability, a mesh net can be mentioned. As an example, an Amidology 30 mesh product manufactured by NBC Meshtec Inc. can be mentioned. However, the present inventors have confirmed that even if the through-hole 22 is closed by this, the obtained spectrum does not change.

The net may have a lattice form or a triangular lattice form. In particular, since the net does not depend on its shape, there is no limitation on the net. The size of the entire net may be larger or smaller than the size of the frame of the present invention. In addition, the size of the net may be a size covering the through-hole 22 of the film 18 in a one-to-one manner. In addition, the net may be a net whose mesh has a size intended for so-called insect repelling, or may be a net that prevents the entry of more fine sand. The material may be a net formed of a synthetic resin, or may be a wire for crime prevention or radio wave shielding.

In addition, the above-described permeable member is not limited to the mesh net. In addition to the net, a nonwoven fabric material, a urethane material, Synthrate (manufactured by 3M Company), Breath Air (manufactured by Toyobo Co., Ltd.), Dot Air (manufactured by Toray Industries, Inc.), and the like can be mentioned. In the present invention, by covering the through-hole 22 with such a material having air permeability, it is possible to prevent insects or sand from passing through the hole, to ensure the privacy such that the inside can be seen from a part of the through-hole 22, and to ensure hiding.

The soundproof structure of the present invention is basically configured as described above.

Since the soundproof structure of the present invention is configured as described above, the soundproof structure of the present invention has features that it is possible to perform low frequency shielding, which has been difficult in conventional soundproof structures, and that it is possible to design a structure capable of strongly insulating noise of various frequencies from low frequencies to frequencies exceeding 1000 Hz. In addition, since the soundproof structure of the present invention is based on the sound insulation principle independent of the mass of the structure (mass law), it is possible to realize a very light and thin sound insulation structure compared with conventional soundproof structures. Therefore, the soundproof structure of the present invention can also be applied to a soundproof target from which it has been difficult to sufficiently insulate sound with the conventional soundproof structures.

The soundproof structure of the present invention has a feature that a weight is not required unlike in the technique disclosed in U.S. Pat. No. 7,395,898B (corresponding Japanese Patent Application Publication: JP2005-250474A) and that a sound insulation structure with manufacturing suitability and high robustness as a sound insulation material is obtained simply by providing a hole in the film. That is, the soundproof structure of the present invention has the following features compared with the technique disclosed in U.S. Pat. No. 7,395,898B (corresponding Japanese Patent Application Publication: JP2005-250474A).

1. Since it is not necessary to use a weight that causes an increase in the mass, it is possible to realize a lighter sound insulation structure.

2. Since a hole can be formed in a film quickly and easily by laser processing or punch hole processing, there is manufacturing suitability.

3. Since the sound insulation characteristic hardly depends on the position or the shape of a hole, stability is high in manufacturing.

4. Since a hole is present, it is possible to realize a structure that shields sound while making a film have air permeability, that is, while allowing wind or heat to pass through the film.

The soundproof structure of the present invention is manufactured as follows.

First, the frame body 16 having a plurality of frames 14, for example, 225 frames 14, and the sheet-shaped film body 20 that covers all the through-holes 12 of all the frames 14 of the frame body 16 are prepared.

Then, the sheet-shaped film body 20 is fixed to all the frames 14 of the frame body 16 with an adhesive to form the film 18 that covers the through-holes 12 of all the frames 14, thereby forming a plurality of soundproof cells having a structure configured to include the frame 14 and the film 18.

Then, one or more holes 22 are drilled in the film 18 of each of the plurality of soundproof cells using a processing method for absorbing energy, such as laser processing, or a mechanical processing method based on physical contact, such as punching or needle processing, thereby forming the opening portion 24 in each soundproof cell 26.

In this manner, it is possible to manufacture the soundproof structure 10 of the present invention.

The soundproof structure manufacturing method of the present invention is basically configured as described above.

EXAMPLES

A soundproof structure and a soundproof structure manufacturing method of the present invention will be described based on examples.

Before performing an experiment to manufacture an example of the present invention and measure the acoustic characteristic, the design of the soundproof structure is shown.

Since the system of the soundproof structure is an interaction system of film vibration and sound waves in air, analysis was performed using coupled analysis of sound and vibration. Specifically, designing was performed using an acoustic module of COMSOLver 5.0 that is analysis software of the finite element method. First, a first natural vibration frequency was calculated by natural vibration analysis. Then, by performing acoustic structure coupled analysis based on frequency sweep in the periodic structure boundary, transmission loss at each frequency with respect to the sound wave incident from the front was calculated.

Based on this design, the shape or the material of the sample was determined. The shielding peak frequency in the experimental result satisfactorily matched the prediction from the simulation.

In addition, acoustic structure coupled analysis simulation was performed to find the correspondence between the shielding peak frequency and each physical property. As the parameter A, a shielding peak frequency was calculated by calculating the transmission loss at each frequency with respect to the sound wave by changing the thickness $t1$ μm of the film 18, the size (or radius) $R1$ mm of the frame 14, the Young's modulus $E1$ GPa of the film, and the circle equivalent radius $r$ μm of the opening portion. The result is shown in FIG. 12. The present inventors have found that the shielding peak frequency is substantially proportional to $\sqrt{(E1)}*(t1^{1.2})*(\ln(r)-e)/(R1^{2.8})$ through this calculation. Accordingly, it was found that the shielding peak frequency could be predicted by setting the parameter $A=\sqrt{(E1)}*(t1^{1.2})*(\ln(r)-e)/(R1^{2.8})$.

In addition, the correspondence between the first natural vibration frequency and each physical property was found by taking advantage of the characteristics of the simulation in which the material characteristics or the film thickness can be freely changed. As the parameter B, natural vibration was calculated by changing the thickness $t2$ m of the film 18, the size (or radius) $R2$ m of the frame 14, the Young's modulus $E2$ Pa of the film, and the density $d$ kg/m³ of the film. The result is shown in FIG. 13. The present inventors have found that a first natural vibration frequency f_resonance is substantially proportional to $t2/R2^2*\sqrt{(E2/d)}$ through this calculation. Accordingly, it was found that natural vibration could be predicted by setting the parameter $B=t2/R2^2*\sqrt{(E2/d)}$.

Example 1

Hereinafter, a method of manufacturing a soundproof structure of Example 1 having the hole 22 with a diameter of 200 μm (=200×10⁻⁶ m) is shown in which the PET film thickness of the film 18 is 50 μm (=50×10⁻⁶ m) and the size of the frame 14 is 7.5 mm (=7.5 x×10⁻³ m).

A PET film Lumirror manufactured by Toray Industries, Inc.) 50 μm product was used as the film 18. An aluminum having a thickness of 3 mm and a width of 3 mm was used as the frame 14, and the shape of the frame 14 was a square. Processing was performed with one side of the square through-hole 12 as 7.5 mm. The frame structure has a total of 225 (15×15) through-holes 12. The frame structure was fixed to the PET film with an adhesive. As a result, a frame•film structure configured to include the frame 14 and the film 18 was manufactured.

A step of drilling the hole 22 in the film 18 of the frame•film structure was performed as follows.

First, a black spot intended for light absorption was drawn on the film 18 using black ink. At this time, the size of the black spot was made as close as possible to the size of a hole to be opened.

Then, green laser (300 mW) of a laser apparatus (Laser Diode manufactured by Nichia Corporation) was emitted to the black spot portion of the film.

Since the visible light absorbance of the PET film was sufficiently small, the laser was absorbed only into the black spot portion to generate absorption heat. Eventually, the hole 22 was opened in the black spot portion. Using an optical microscope (ECLIPSE manufactured by Nikon Corporation), the size of the hole 22 was measured. As a result, a circular hole diameter of 200 μm was obtained at the center of the frame 14. In this manner, it is possible to manufacture the soundproof structure of Example 1 of the present invention.

The acoustic characteristics were measured by a transfer function method using four microphones in a self-made aluminum acoustic tube. This method is based on "ASTM E2611-09: Standard Test Method for Measurement of Normal Incidence Sound Transmission of Acoustical Materials Based on the Transfer Matrix Method". As the acoustic tube, for example, an acoustic tube based on the same measurement principle as WinZac manufactured by Nitto Bosei Aktien Engineering Co., Ltd. was used. It is possible to measure the sound transmission loss in a wide spectral band using this method. The soundproof structure of Example 1 was disposed in a measurement portion of the acoustic tube, and the sound transmission loss was measured in the range of 10 Hz to 40000 Hz. The measurement range was measured by combining a plurality of diameters of acoustic tubes or a plurality of distances between microphones.

In general, as the distance between the microphones increases, the amount of measurement noise decreases at low frequencies. On the other hand, if the distance between the microphones is larger than the wavelength/2 on the high frequency side, measurement can not be performed in principle. Accordingly, measurement was performed multiple times while changing the distance between the microphones. In addition, if the acoustic tube is thick, measurement can not be performed due to the influence of high-order mode on the high frequency side. Accordingly, measurement was performed using a plurality of kinds of diameters of the acoustic tube.

FIG. 6 shows a measurement result of the transmission loss.

As is apparent from the result shown in FIG. 1, it was found that very strong shielding occurred near 1000 Hz.

Hereinafter, since the measurement methods are the same ill all of Examples 2 to 42 and Comparative Examples 1 and 2, methods of manufacturing a sample of Examples and Comparative Examples are shown.

The shape, size, and material of the frame 14 of each of the manufactured soundproof structures of Examples 1 to 42 and Comparative Examples 1 and 2, the type, thickness, and first natural vibration frequency of the film 18, the size and the shape of the hole 22, the number of holes 22, the maximum shielding peak frequency (hereinafter, simply referred to as a shielding frequency) of the spectrum obtained ill each example and each comparative example, the transmission loss, and values of the parameters A and B are shown in Tables 3 to 5.

Comparative Example 1

Measurement was performed using the frame film structure manufactured in Example 1 as it was without drilling holes. The results are shown ill Table 3. In addition, the measurement results of the transmission loss are shown in FIG. 7. Sound insulation according to the general mass law and stiffness law was obtained. The switching occurred near 2820 Hz, which shows that this frequency matches the first natural vibration frequency of the film.

Comparative Example 2

Figure 14:
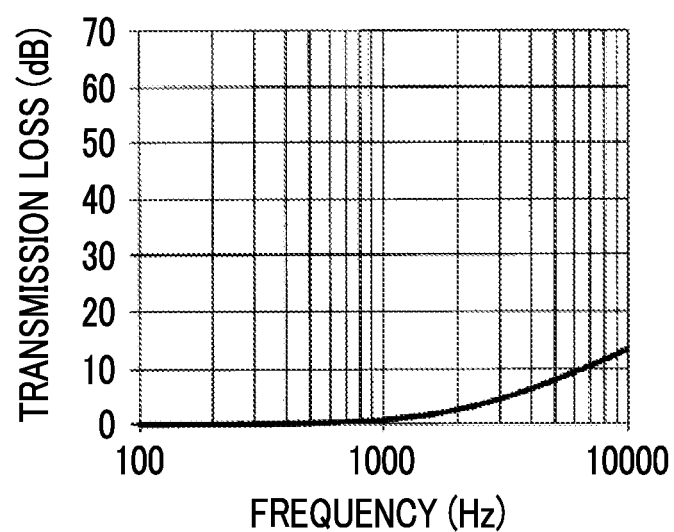
FIG. 14 is a graph showing a sound insulation characteristic of a soundproof structure of Comparative Example 2.

For the film (PET film 50 μm) used in Example 1, holes were drilled at intervals of 7.5 mm without attaching a frame. The diameter of the hole was 200 μm in accordance with Example 1. The results are shown in Table 3, and the measurement results of the transmission loss are shown in FIG. 14. In general, in a structure with only holes in a plate, it becomes easier for sound to pass through the structure as the frequency becomes lower, and it becomes more difficult for sound to pass through the structure as the frequency becomes higher. This characteristic is also obtained in this experiment. At this time, neither the first natural vibration frequency nor the shielding peak is observed.

In calculating the parameters A and B in the table, since there was no frame, the calculation was performed assuming that the radius R of the frame was infinite (R→∞).

Examples 2 to 7

A frame-film structure was prepared in the same manner as in Example 1. Since it is known that the amount of heat generated can be changed by changing the laser irradiation time and accordingly the size of the hole 22 can be changed, the desired hole 22 of 20 μm 2000 μm was able to be obtained on the PET film by optimizing the laser irradiation time and power. Table 3 shows the results obtained in this manner that include a shielding frequency in the soundproof structure of each example. The sound insulation characteristic of Example 5 is shown by the dotted line in FIG. 10.

Example 8

After manufacturing a frame-film structure in the same manner as in Example 1, the hole 22 was physically formed by sticking a needle into the film instead of forming the hole 22 by laser irradiation. By adjusting the force, it was possible to obtain the hole 22 with a diameter of 200 μm. The shielding spectrum (transmission loss) of Example 8 obtained in this manner was obtained with no change from that of Example 1. The results are shown in Table 3.

Examples 9 to 11

A soundproof structure with a hole diameter of 200 μm was obtained using the same manufacturing method except that the thickness of the PET film used in Example 1 was changed from the 50 μm product to 20 μm, 100 μm, and 200 μm products. Table 3 shows the measurement results of each example obtained in this manner.

Figure 8:
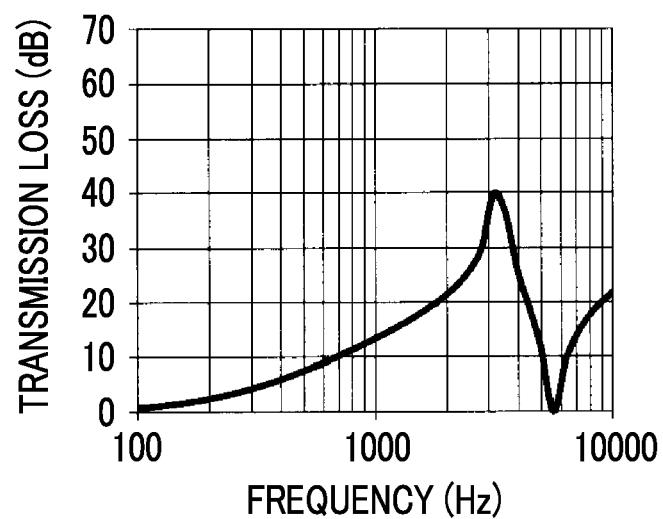
FIG. 8 is a graph showing the sound insulation characteristic of a soundproof structure of Example 10 of the present invention.

As the film thickness increases, the flexural stiffness increases, and accordingly the first vibration mode of natural vibration is shifted to high frequency. Accordingly, the shielding frequency at the same hole diameter was also shifted to high frequency. FIG. 8 shows the shielding spectrum of Example 10 having a thickness of 100 μm.

Examples 12 to 17

A soundproof structure sample was manufactured under the same conditions as the conditions of Example 1 except that the size of the frame was changed. One side of the square through-hole 12 was processed to be 15 mm. The frame 14 itself is the same as the thickness 3 mm×width 3 mm. There are a total of 64 through-holes 12 (8×8) of the frames 14 of the frame body 16. The holes 22 having different hole sizes (20, 100, 200, 400, 1000, and 2000 μm) were obtained by processing the hole 22 with laser as in Example 1 and adjusting the laser irradiation time and power. The measurement results of Examples 12 to 15 obtained in this manner are shown in Table 3, and the measurement results of Examples 16 to 17 are shown in Table 4.

Figure 15:
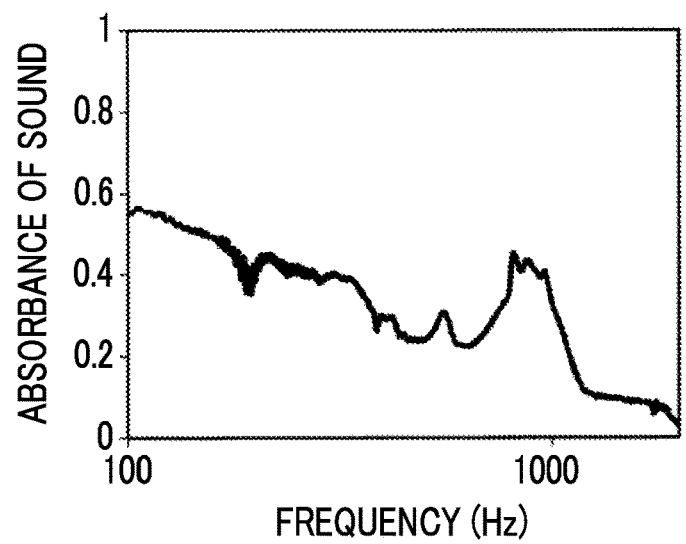
FIG. 15 is a graph showing the absorption characteristic of a soundproof structure of Example 16 of the present invention.

The absorbance of sound (energy of sound waves) of the soundproof structure sample of Example 16 was calculated. The measurement was performed by the transfer function method using the same four microphones as in Example 1, and the absorbance was calculated from the measured transmittance and reflectance. Here, the absorbance can be calculated from the following equation. The result is shown in FIG. 15.

Absorption rate=1−transmittance−reflectance

Figure 16:
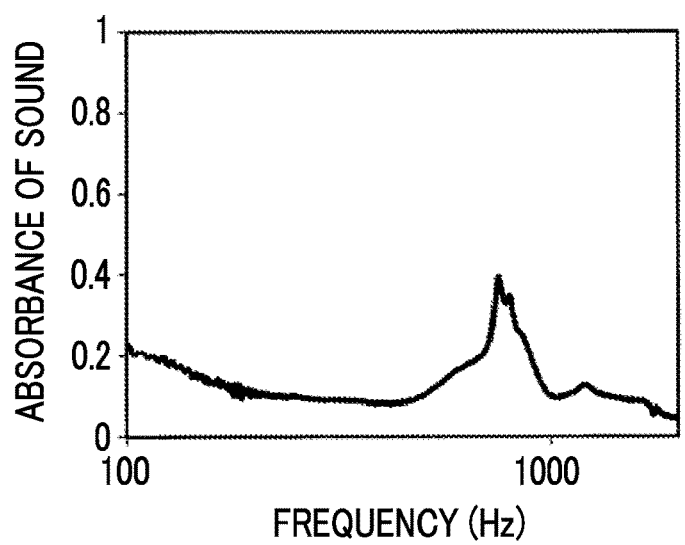
FIG. 16 is a graph showing the absorption characteristic of a reference soundproof structure before opening the hole of the soundproof structure of Example 16.

In addition, for comparison, the absorbance of sound of a reference soundproof structure sample without the hole 22 before drilling the hole 22 in the middle of manufacturing the soundproof structure sample of Example 16 was also measured. The result is shown in FIG. 16.

Examples 18 and 19

Since the first natural vibration frequency in the case of the same material was almost the same frequency as that in a case where the ratio between the square of the thickness and the length of one side of the square was fixed, a soundproof structure sample was prepared in the same manner as in Example 1 except that the frame size was 15 mm and the thickness of the PET film was 200 µm in order to match Example 1. The size of the hole 22 was adjusted so as to be a diameter of 200 µm in Example 18 and a diameter of 400 µm in Example 19. Table 4 shows the measurement results of each example obtained in this manner. The first natural vibration frequency was obtained at 2820 Hz as in Example 1, and large shielding was obtained in a region of 1000 Hz or more.

Example 20

Under the conditions of Example 1, the size of the frame 14 was changed to 30 mm and the thickness of the film 18 was changed to 200 and other conditions including the hole size were made the same to manufacture a soundproof structure sample. The measurement results of Example 20 obtained in this manner are shown in Table 4. As the conditions of Example 20, the thickness of the film 18 was 4 times that in the conditions of Example 14 and the size of the frame 14 was twice that in the conditions of Example 14. Accordingly, it is expected that the first vibration mode of natural vibration is the same, and the same frequency was actually obtained in a case where measurement was performed.

Example 21

Figure 9:
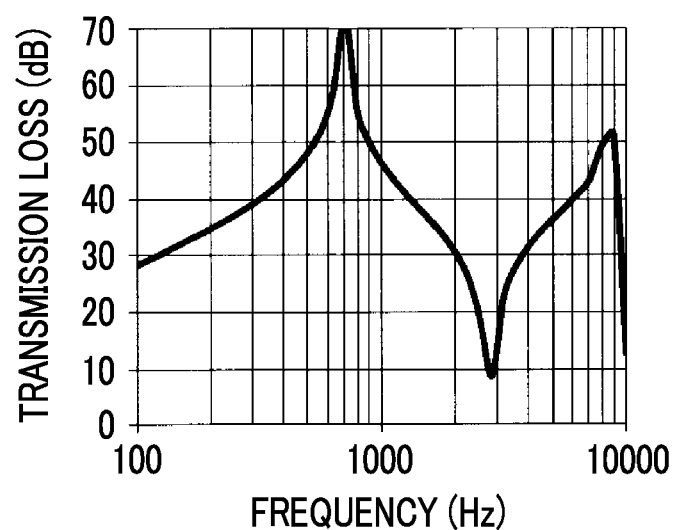
FIG. 9 is a graph showing the sound insulation characteristic of a soundproof structure of Example 21 of the present invention.

A soundproof structure sample was manufactured under the same conditions as in Example 20 except that the film thickness was changed to 800 µm instead of 200 µm. The measurement results of Example 21 obtained in this manner are shown in Table 4. In Example 21, the film thickness was 16 times that in Example 1 and the frame size was 4 times that in Example 1. Accordingly, it was expected that the first vibration mode of natural vibration was the same. In a case where measurement was performed, the peak (minimum) of transmission actually appeared at the same frequency of 2820 Hz. As the peak (maximum) of the transmission loss, a large peak appeared at 708 Hz. The transmission loss spectrum is shown in FIG. 9.

Example 22

A soundproof structure sample was manufactured in the same manner as in Example 21 except that the hole diameter was changed from 200 µm to 1600 µm. The measurement results of Example 22 obtained in this manner are shown in Table 4.

Even in a case where the size of the frame 14 was large, shielding at 2000 Hz or higher was possible.

Example 23

Figure 10:
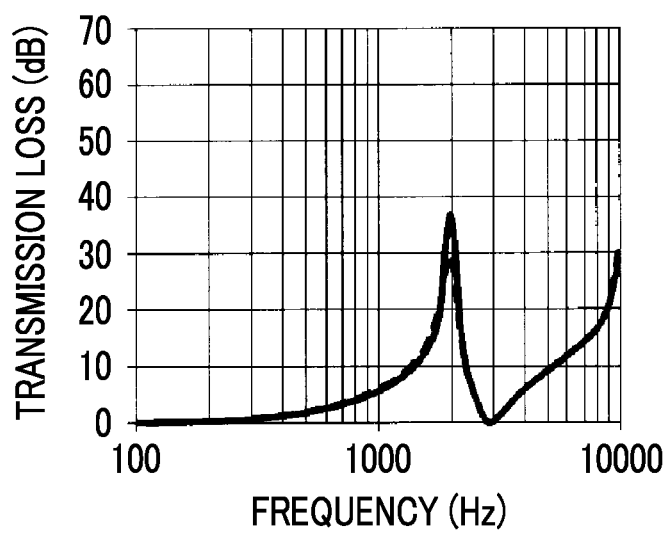
FIG. 10 is a graph showing the sound insulation characteristic of a soundproof structure of Examples 5 and 23 of the present invention.

Four holes with a hole diameter of 200 µm were drilled in a central portion instead of drilling a single through-hole in a central portion in Example 1. Except for this, a soundproof structure sample was manufactured under the same conditions as in Example 1. The measurement results of Example 23 obtained in this manner are shown in Table 4. The transmission loss spectrum of Examples 5 and 23 is shown in FIG. 10. The shielding frequency was the same as that in the case of a single hole with a hole diameter of 400 µm of Example 5, and was 2000 Hz. That is, in a case where the through-holes 22 on the film 18 in the frame 14 had the same opening ratio without changing other conditions, the shielding spectrum in the case of the single hole 22 and the shielding spectrum in the case of a plurality of holes 22 were almost the same.

Examples 24 and 30

The drilling position of the hole 22 having a hole diameter of 200 µm was shifted on the diagonal line in the square frame instead of drilling a single through-hole in the central portion in Example 1. Except for this, a soundproof structure sample was manufactured under the same conditions as in Example 1. Table 4 shows the measurement results of each example obtained in this manner. Since the shielding frequency is the same as in Example 1 in which the hole 22 is drilled at the center, it is apparent that the soundproof system is very robust for the position of the hole 22 on the film 18.

Example 31

Three holes having a hole diameter of 200 µm and four holes having a hole diameter of 100 µm were drilled in the same soundproof cell 26 instead of drilling a single through-hole in Example 1. Except for this, a soundproof structure sample was manufactured under the same conditions as in Example 1. The measurement results of Example 31 obtained in this manner are shown in Table 5. The shielding frequency is 2000 Hz, and this is the same shielding frequency as in the case of a single hole with a hole diameter of 400 µm of Example 5. The total hole area in a cell in Example 5 is the same as that in this example.

Example 32

Acrylic processed into a frame shape was used instead of using aluminum as a frame material In Example 1. Except for this, a soundproof structure sample was manufactured under the same conditions as in Example 1. The measurement results of Example 32 obtained in this manner are shown in Table 5. The same effect was obtained even if the material of the frame 14 is changed.

Example 33

A polyimide film was used instead of using the PET film as a film material in Example 1.

Except for this, a soundproof structure sample was manufactured under the same conditions as in Example 1. The measurement results of Example 33 obtained in this manner are shown in Table 5. Similarly to the case of the PET film, also with the polyimide film, the soundproof structure configured to include the frame 14, the film 18, and the hole 22 had a peak where the transmission loss was large.

Example 34

An aluminum frame processed into a frame shape of the circular through-hole 12 was used instead of the aluminum frame processed into the frame shape of the square through-hole 12 in Example 1. Except for this, a soundproof structure sample was manufactured under the same conditions as in Example 1. The measurement results of Example 34 obtained in this manner are shown in Table 5.

Example 35

The shape of black ink drawn on the PET film was formed into a square shape in Example 1.

At this time, the length of one side was set to 200 [($\sqrt{\pi}$)/2] μm so that the area of the hole 22 was the same as that in Example 1 (circle equivalent diameter is defined as the diameter of a circle having the same area). At this time, an inkjet method was used for drawing. The laser diameter was reduced to about 20 μm, and irradiation was performed so as to scan a black spot shape. By adjusting the laser power, it was possible to obtain the square hole 22. The measurement results of Example 35 obtained in this manner are shown in Table 5. The same result as in Example 1 was obtained for the shielding frequency. This indicates that the shielding characteristic does not depend on the shape of the hole 22 in the case of the same area.

Example 36

A rectangular black ink shape was formed instead of the square black ink shape in Example 35. The long side was set to 200 $\sqrt{\pi}$μm and the short side was set to 200 [$\sqrt{\pi}$/4] μm to obtain the same area. In the same manner as in Example 35, a rectangular hole could be obtained. The measurement results of Example 36 obtained in this manner are shown in Table 5.

Example 37

A soundproof structure sample was manufactured in the same manner as in Example 1 except that an aluminum foil having a thickness of 20 μm was used as the film 18 instead of the PET film. The measurement results of Example 37 obtained in this manner are shown in Table 5. The through-hole 22 was formed by a needle. At this time, both the film 18 and the frame 14 are formed of aluminum as the same material. Since aluminum has a higher Young's modulus/density than general polymer film material, a peak appears on the high frequency side even if the aluminum film is thinner than the PET film.

Example 38

Figure 11:
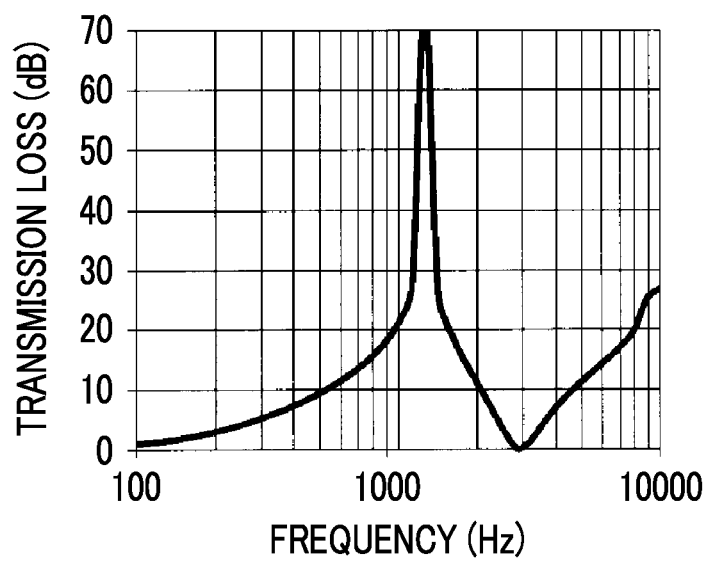
FIG. 11 is a graph showing the sound insulation characteristic of a soundproof structure of Example 38 of the present invention.

A soundproof structure sample configured to include the soundproof cell 26, which alternately had the hole 22 with a hole diameter of 200 μm and the hole 22 with a hole diameter of 100 μm, was manufactured instead of performing the same hole diameter processing in all the cells in Example 1. The measurement results of Example 38 obtained in this manner are shown in Table 5. The transmission loss spectrum of Example 38 is shown in FIG. 11. At this time, the maximum (peak) frequency of shielding was 1258 Hz. According to Examples 1 and 4, since the shielding frequency of the single soundproof cell 26 having the respective holes 22 was 1412 Hz and 1000 Hz, it was possible to realize shielding at a frequency intermediate therebetween.

Examples 39 to 41

A soundproof structure sample of each example was manufactured in the same manner as in Example 34 except that the diameter of the circular through-hole 12 of the frame 14 was changed from 7.5 mm to 4 mm, 2 mm, and 2 mm in Example 34 and the diameter of the circular hole 22 was changed from 200 mm to 40 mm only in Example 41.

The measurement results of each example obtained in this manner are shown in Table 5. It can be seen that both the first natural vibration frequency and the shielding frequency largely shift to the high frequency side as the size of the frame decreases.

Example 42

As the acoustic tube, an acoustic tube having an inner side length of 15 mm was prepared. In order to manufacture a soundproof structure sample, a 15-mm frame 14 formed of single aluminum (Al) was prepared instead of using the 15×15 frame 14 in Example 18, and others were the same as in Example 18. The sample was manufactured by drilling a circular hole having a diameter of 200 μm as the hole 22 in the PET film having a thickness of 200 μm as the film 18. At this time, since the acoustic tube and the frame 14 of the sample had completely the same size, the frame 14 of the sample was made to match the sample holder of the acoustic tube so that measurements could be performed using the acoustic tube for a soundproof structure configured to include only one cell structure.

The results are shown in Table 5. The results were the same as the measurement results of Example 18.

TABLE 3

| Number | Shape of frame | Size (m) of frame (×10⁻³) | Material of frame | Type of film | Thickness of (m) of film (×10⁻⁶) | First natural vibration frequency (Hz) of film | Diameter size (m) of hole (×10⁻⁶) | Shape of hole |
|---|---|---|---|---|---|---|---|---|
| EXAMPLE 1 | Square | 7.5 | Aluminum | PET | 50 | 2820 | 200 | Circle |
| COMPARATIVE EXAMPLE 1 | Square | 7.5 | Aluminum | PET | 50 | 2820 | None | None |
| COMPARATIVE EXAMPLE 2 | None | — | — | PET | 50 | None | 200 | Circle |
| EXAMPLE 2 | Square | 7.5 | Aluminum | PET | 50 | 2820 | 20 | Circle |
| EXAMPLE 3 | Square | 7.5 | Aluminum | PET | 50 | 2820 | 40 | Circle |
| EXAMPLE 4 | Square | 7.5 | Aluminum | PET | 50 | 2820 | 100 | Circle |
| EXAMPLE 5 | Square | 7.5 | Aluminum | PET | 50 | 2820 | 400 | Circle |
| EXAMPLE 6 | Square | 7.5 | Aluminum | PET | 50 | 2820 | 1000 | Circle |
| EXAMPLE 7 | Square | 7.5 | Aluminum | PET | 50 | 2820 | 2000 | Circle |
| EXAMPLE 8 | Square | 7.5 | Aluminum | PET | 50 | 2820 | 200 | Circle |
| EXAMPLE 9 | Square | 7.5 | Aluminum | PET | 20 | 1410 | 200 | Circle |
| EXAMPLE 10 | Square | 7.5 | Aluminum | PET | 100 | 5620 | 200 | Circle |
| EXAMPLE 11 | Square | 7.5 | Aluminum | PET | 200 | 11240 | 200 | Circle |

TABLE 3-continued

| Number | Shape of frame | Size (m) of frame (×10⁻³) | Material of frame | Type of film | Thickness of (m) of film (×10⁻⁶) | First natural vibration frequency (Hz) of film | Diameter size (m) of hole (×10⁻⁶) | Shape of hole |
|---|---|---|---|---|---|---|---|---|
| EXAMPLE 12 | Square | 15 | Aluminum | PET | 50 | 708 | 20 | Circle |
| EXAMPLE 13 | Square | 15 | Aluminum | PET | 50 | 708 | 100 | Circle |
| EXAMPLE 14 | Square | 15 | Aluminum | PET | 50 | 708 | 200 | Circle |
| EXAMPLE 15 | Square | 15 | Aluminum | PET | 50 | 708 | 400 | Circle |

| Number | Number of holes | Shielding peak frequency | Peak transmission loss (dB) | Remarks | Parameter A | Parameter B |
|---|---|---|---|---|---|---|
| EXAMPLE 1 | 1 | 1412 | 35 | Basic | 7.709 | 5007 |
| COMPARATIVE EXAMPLE 1 | 0 | None | None | No hole | None | 5007 |
| COMPARATIVE EXAMPLE 2 | 1 | None | None | No frame | 0 | 0 |
| EXAMPLE 2 | 1 | 281 | 53 | Hole size difference | −1.697 | 5007 |
| EXAMPLE 3 | 1 | 501 | 47 | Hole size difference | 1.135 | 5007 |
| EXAMPLE 4 | 1 | 1000 | 59 | Hole size difference | 4.878 | 5007 |
| EXAMPLE 5 | 1 | 2000 | 29 | Hole size difference | 10.54 | 5007 |
| EXAMPLE 6 | 1 | 2500 | 24 | Hole size difference | 14.28 | 5007 |
| EXAMPLE 7 | 1 | 2800 | 4 | Hole size difference | 17.12 | 5007 |
| EXAMPLE 8 | 1 | 1412 | 35 | Hole using needle | 7.709 | 5007 |
| EXAMPLE 9 | 1 | 501 | 45 | Thickness difference | 2.567 | 2003 |
| EXAMPLE 10 | 1 | 3162 | 40 | Thickness difference | 17.71 | 10010 |
| EXAMPLE 11 | 1 | 7080 | 53 | Thickness difference | 40.69 | 20030 |
| EXAMPLE 12 | 1 | None (less than 100 Hz) | | Frame size difference | −0.244 | 1252 |
| EXAMPLE 13 | 1 | 126 | 41 | Frame size difference | 0.700 | 1252 |
| EXAMPLE 14 | 1 | 200 | 29 | Frame size difference | 1.107 | 1252 |
| EXAMPLE 15 | 1 | 282 | 34 | Frame size difference | 1.514 | 1252 |

TABLE 4

| Number | Shape of frame | Size (m) of frame (×10⁻³) | Material of frame | Type of film | Thickness of (m) of film (×10⁻⁶) | First natural vibration frequency (Hz) of film | Diameter size (m) of hole (×10⁻⁶) | Shape of hole |
|---|---|---|---|---|---|---|---|---|
| EXAMPLE 16 | Square | 15 | Aluminum | PET | 50 | 708 | 1000 | Circle |
| EXAMPLE 17 | Square | 15 | Aluminum | PET | 50 | 708 | 2000 | Circle |
| EXAMPLE 18 | Square | 15 | Aluminum | PET | 200 | 2820 | 200 | Circle |
| EXAMPLE 19 | Square | 15 | Aluminum | PET | 200 | 2820 | 400 | Circle |
| EXAMPLE 20 | Square | 30 | Aluminum | PET | 200 | 708 | 400 | Circle |
| EXAMPLE 21 | Square | 30 | Aluminum | PET | 800 | 2818 | 400 | Circle |
| EXAMPLE 22 | Square | 30 | Aluminum | PET | 800 | 2818 | 1600 | Circle |
| EXAMPLE 23 | Square | 7.5 | Aluminum | PET | 50 | 2820 | 200 × 4 | Circle |
| EXAMPLE 24 | Square | 7.5 | Aluminum | PET | 50 | 2820 | 200 | Circle |
| EXAMPLE 25 | Square | 7.5 | Aluminum | PET | 50 | 2820 | 200 | Circle |
| EXAMPLE 26 | Square | 7.5 | Aluminum | PET | 50 | 2820 | 200 | Circle |
| EXAMPLE 27 | Square | 7.5 | Aluminum | PET | 50 | 2820 | 200 | Circle |
| EXAMPLE 28 | Square | 7.5 | Aluminum | PET | 50 | 2820 | 200 | Circle |
| EXAMPLE 29 | Square | 7.5 | Aluminum | PET | 50 | 2820 | 200 | Circle |
| EXAMPLE 30 | Square | 7.5 | Aluminum | PET | 50 | 2820 | 200 | Circle |

| Number | Number of holes | Shielding peak frequency | Peak transmission loss (dB) | Remarks | Parameter A | Parameter B |
|---|---|---|---|---|---|---|
| EXAMPLE 16 | 1 | 398 | 14 | Frame size difference | 2.051 | 1252 |
| EXAMPLE 17 | 1 | 501 | 6 | Frame size difference | 2.458 | 1252 |
| EXAMPLE 18 | 1 | 1112 | 51 | Frame size difference · film thickness adjustment | 5.843 | 5007 |
| EXAMPLE 19 | 1 | 1585 | 47 | Frame size difference · film thickness adjustment | 7.989 | 5007 |
| EXAMPLE 20 | 1 | 141 | 47 | Frame size difference · film thickness adjustment | 1.147 | 1252 |
| EXAMPLE 21 | 1 | 708 | 72 | Frame size difference · film thickness adjustment | 6.054 | 5007 |
| EXAMPLE 22 | 1 | 2238 | 47 | Frame size difference · film thickness adjustment | 9.307 | 5007 |
| EXAMPLE 23 | 4 | 2000 | 37 | Number of holes | 13.37 | 5007 |

TABLE 4-continued

| | | | | | | | |
|---|---|---|---|---|---|---|---|
| EXAMPLE 24 | 1 | 1412 | 35 | Position shift 0.5 mm | 7.709 | 5007 |
| EXAMPLE 25 | 1 | 1412 | 36 | Position shift 1.0 mm | 7.709 | 5007 |
| EXAMPLE 26 | 1 | 1412 | 39 | Position shift 1.5 mm | 7.709 | 5007 |
| EXAMPLE 27 | 1 | 1412 | 44 | Position shift 2.0 mm | 7.709 | 5007 |
| EXAMPLE 28 | 1 | 1412 | 58 | Position shift 2.5 mm | 7.709 | 5007 |
| EXAMPLE 29 | 1 | 1412 | 42 | Position shift 3.0 mm | 7.709 | 5007 |
| EXAMPLE 30 | 1 | 1412 | 29 | Position shift 3.5 mm | 7.709 | 5007 |

TABLE 5

| Number | Shape of frame | Size (m) of frame ($\times 10^{-3}$) | Material of frame | Type of film | Thickness of (m) of film ($\times 10^{-6}$) | First natural vibration frequency (Hz) of film | Diameter size (m) of hole ($\times 10^{-6}$) | Shape of hole |
|---|---|---|---|---|---|---|---|---|
| EXAMPLE 31 | Square | 7.5 | Aluminum | PET | 50 | 2820 | 100 × 4 200 × 3 | Circle |
| EXAMPLE 32 | Square | 7.5 | Acrylic | PET | 50 | 2820 | 200 | Circle |
| EXAMPLE 33 | Square | 7.5 | Aluminum | Polyimide | 50 | 3162 | 200 | Circle |
| EXAMPLE 34 | Circle | Diameter 7.5 | Aluminum | PET | 50 | 2820 | 200 | Circle |
| EXAMPLE 35 | Circle | Diameter 7.5 | Aluminum | PET | 50 | 2820 | Circuit equivalent diameter 200 | Square |
| EXAMPLE 36 | Circle | Diameter 7.5 | Aluminum | PET | 50 | 2820 | Circuit equivalent diameter 200 | Rectangular |
| EXAMPLE 37 | Square | 7.5 | Aluminum | Aluminum | 20 | 5011 | 200 | Circle |
| EXAMPLE 38 | Square | 7.5 | Aluminum | PET | 50 | 2820 | 200 and 100 Alternate | Circle |
| EXAMPLE 39 | Circle | Diameter 4 | Aluminum | PET | 50 | 11170 | 200 | Circle |
| EXAMPLE 40 | Circle | Diameter 2 | Aluminum | PET | 50 | 44340 | 200 | Circle |
| EXAMPLE 41 | Circle | Diameter 2 | Aluminum | PET | 50 | 44340 | 40 | Circle |
| EXAMPLE 42 | Square | 15 | Aluminum | PET | 200 | 2820 | 200 | Circle |

| Number | Number of holes | Shielding peak frequency | Peak transmission loss (dB) | Remarks | Parameter A | Parameter B |
|---|---|---|---|---|---|---|
| EXAMPLE 31 | Total 7 | 2000 | 38 | Number of holes | 13.37 | 5007 |
| EXAMPLE 32 | 1 | 1412 | 35 | Frame material | 7.709 | 5007 |
| EXAMPLE 33 | 1 | 1584 | 31 | Film material | 8.126 | 5277 |
| EXAMPLE 34 | 1 | 1412 | 35 | Basic | 10.81 | 6375 |
| EXAMPLE 35 | 1 | 1412 | 35 | Basic | 10.81 | 6375 |
| EXAMPLE 36 | 1 | 1412 | 35 | Basic | 10.81 | 6375 |
| EXAMPLE 37 | 1 | 2818 | 37 | Film material difference | 10.48 | 5999 |
| EXAMPLE 38 | Each cell 1 | 1258 | 70 | Hole size two types | 10.11 | 5007 |
| EXAMPLE 39 | 1 | 8317 | 35 | Resonant frequency | 62.85 | 22410 |
| EXAMPLE 40 | 1 | No peak (<30000 Hz) | | Resonant frequency | 437.7 | 89610 |
| EXAMPLE 41 | 1 | 26300 | 65 | Resonant frequency | 64.42 | 89580 |
| EXAMPLE 42 | 1 | 1112 | 51 | One cell | 5.843 | 5007 |

As is apparent from Tables 3 to 5, in Examples 1 to 42 that are the soundproof structures of the present invention, unlike Comparative Examples 1 and 2, a shielding peak where the transmission loss is a peak is present at a shielding peak frequency on the lower frequency side than the first natural vibration frequency. Therefore, it is possible to selectively insulate sound in a frequency band of a predetermined width having the shielding peak frequency at its center.

In addition, as is apparent from FIG. 16, in a reference soundproof structure sample without the hole 22 in the middle of manufacturing the soundproof structure sample of Example 16, only the peak of absorption of sound due to large shaking of the film at the first natural vibration frequency of the system was large. On the other hand, as is apparent from FIG. 15, in the soundproof structure sample of Example 16, it can be seen that the absorbance on the lower frequency side is increased as a whole by drilling the hole 22 and accordingly the absorption performance is improved. In the soundproof structure sample of Example 16, in particular, it was found that larger absorption occurred on the lower frequency side than the shielding peak caused by the hole 22.

From the above, it can be seen that the soundproof structure of the present invention has an excellent sound insulation characteristic capable of shielding a specific target frequency component very strongly and can increase the absorption of components on the lower frequency side.

While the soundproof structure and the soundproof structure manufacturing method of the present invention have been described in detail with reference to various embodiments and examples, the present invention is not limited to these embodiments and examples, and various improvements or modifications may be made without departing from the scope and spirit of the present invention.

EXPLANATION OF REFERENCES

10: soundproof structure
12: through-hole
14: frame
15: plate-shaped member
16: frame body
18: film
20: film body
22: hole (through-hole)
24: opening portion
26: soundproof cell

What is claimed is:

1. A soundproof structure, comprising:
one or more soundproof cells,
wherein each of the one or more soundproof cells comprises a frame having a through-hole, a film fixed to the frame, and an opening portion configured to include one or more holes drilled in the film,
neither end portions of the through-hole of the frame are closed, and
the soundproof structure has a shielding peak frequency, which is determined by the opening portion of each of the one or more soundproof cells and at which a transmission loss is maximized, on a lower frequency side than a first natural vibration frequency of the film of each of the one or more soundproof cells, and selectively insulates sound in a predetermined frequency band including the shielding peak frequency at its center.

2. The soundproof structure according to claim 1, wherein the one or more soundproof cells are a plurality of soundproof cells arranged in a two-dimensional manner.

3. The soundproof structure according to claim 1, wherein the first natural vibration frequency is determined by a geometric form of the frame of each of the one or more soundproof cells and stiffness of the film of each of the one or more soundproof cells, and the shielding peak frequency is determined according to an area of the opening portion of each of the one or more soundproof cells.

4. The soundproof structure according to claim 1, wherein the first natural vibration frequency is determined by a shape and a size of the frame of each of the one or more soundproof cells and thickness and flexibility of the film of each of the one or more soundproof cells, and
the shielding peak frequency is determined according to an average area ratio of the opening portions of the one or more soundproof cells.

5. The soundproof structure according to claim 1, wherein the first natural vibration frequency is included within a range of 10 Hz to 100000 Hz.

6. The soundproof structure according to claim 1, wherein, assuming that a circle equivalent radius of the frame is R1 mm, a thickness of the film is t1 μm, a Young's modulus of the film is E1 GPa, and a circle equivalent radius of the opening portion is r μm, a parameter A expressed by following Equation (1) is 0.07000 or more and 759.1 or less, $$A = \sqrt{(E1)} * (t1^{1.2}) * (\ln(r) - e)/(R1^{2.8}) \quad (1)$$

where e is a Napier's constant, and ln(x) is a logarithm of x with base e.

7. The soundproof structure according to claim 1, wherein, assuming that a circle equivalent radius of the frame is R2 m, a thickness of the film is t2 m, a Young's modulus of the film is E2 Pa, and a density of the film is d kg/m$^3$, a parameter B expressed by following Equation (2) is 15.47 or more and 235000 or less, $$B = t2/R2^{2} * \sqrt{(E2/d)} \quad (2).$$

8. The soundproof structure according to claim 1, wherein the opening portion of each of the one or more soundproof cells is formed by one hole.

9. The soundproof structure according to claim 1, wherein the opening portion of each of the one or more soundproof cells is formed by a plurality of holes having the same size.

10. The soundproof structure according to claim 1, wherein, in a case where the one or more soundproof cells are a plurality of soundproof cells arranged in a two-dimensional manner, 70% or more of the opening portion of each of the plurality of soundproof cells is formed by a plurality of holes having the same size.

11. The soundproof structure according to claim 1, wherein a size of each of the one or more holes of the opening portion of each of the one or more soundproof cells is 2 μm or more.

12. The soundproof structure according to claim 1, wherein a size of the frame of each of the one or more soundproof cells is equal to or less than a wavelength size corresponding to the shielding peak frequency.

13. The soundproof structure according to claim 1, wherein the one or more holes of the opening portion of each of the one or more soundproof cells are holes drilled using a processing method for absorbing energy.

14. The soundproof structure according to claim 13, wherein the processing method for absorbing energy is laser processing.

15. The soundproof structure according to claim 1, wherein the one or more holes of the opening portion of each of the one or more soundproof cells are holes drilled using a mechanical processing method based on physical contact.

16. The soundproof structure according to claim 15, wherein the mechanical processing method is punching or needle processing.

17. The soundproof structure according to claim 1, wherein the film is impermeable to air.

18. The soundproof structure according to claim 1, wherein one hole of the opening portion of the soundproof cell is provided at a center of the film.

19. The soundproof structure according to claim 1, wherein the film is formed of a flexible elastic material.

20. The soundproof structure according to claim 1, wherein, in a case where the one or more soundproof cells are a plurality of soundproof cells arranged in a two-dimensional manner, the plurality of frames of the plurality of soundproof cells are formed as one frame body arranged so as to be connected in a two-dimensional manner.

21. The soundproof structure according to claim 1, wherein, in a case where the one or more soundproof cells are a plurality of soundproof cells arranged in a two-dimensional manner, the plurality of films of the plurality of soundproof cells are formed by one sheet-shaped film body that covers the plurality of frames of the plurality of soundproof cells.

22. A soundproof structure manufacturing method, comprising:
in a case of manufacturing the soundproof structure according to claim 1, drilling the one or more holes of the opening portion of each of the one or more soundproof cells in the film of each of the one or more soundproof cells using a processing method for absorbing energy or a mechanical processing method based on physical contact.

23. The soundproof structure manufacturing method according to claim 22,
wherein the processing method for absorbing energy is laser processing, and
the mechanical processing method is punching or needle processing.

24. The soundproof structure according to claim 1,
wherein the one or more soundproof cells are a plurality of soundproof cells arranged in a two-dimensional manner,
the first natural vibration frequency is determined by a geometric form of the frame of each of the one or more soundproof cells and stiffness of the film of each of the one or more soundproof cells,
the shielding peak frequency is determined according to an area of the opening portion of each of the one or more soundproof cells,
the first natural vibration frequency is determined by a shape and a size of the frame of each of the one or more soundproof cells and thickness and flexibility of the film of each of the one or more soundproof cells,
the shielding peak frequency is determined according to an average area ratio of the opening portions of the one or more soundproof cells, and
the first natural vibration frequency is included within a range of 10 Hz to 100000 Hz.

25. The soundproof structure according to claim 1,
wherein assuming that a circle equivalent radius of the frame is R1 mm, a thickness of the film is t1 μm, a Young's modulus of the film is E1 GPa, and a circle equivalent radius of the opening portion is r μm, a parameter A expressed by following Equation (1) is 0.07000 or more and 759.1 or less, $$A=\sqrt{(E1)}*(t1^{1.2})*(\ln(r)-e)/(R1^{2.8}) \quad (1)$$

where e is a Napier's constant, and ln(x) is a logarithm of x with base e, and
wherein, assuming that a circle equivalent radius of the frame is R2 m, a thickness of the film is t2 m, a Young's modulus of the film is E2 Pa, and a density of the film is d kg/m³, a parameter B expressed by following Equation (2) is 15.47 or more and 235000 or less, $$B=t2/R2^{2}*\sqrt{(E2/d)} \quad (2).$$

26. The soundproof structure according to claim 1,
wherein the one or more soundproof cells are a plurality of soundproof cells arranged in a two-dimensional manner,
the first natural vibration frequency is determined by a geometric form of the frame of each of the one or more soundproof cells and stiffness of the film of each of the one or more soundproof cells,
the shielding peak frequency is determined according to an area of the opening portion of each of the one or more soundproof cells,
the first natural vibration frequency is determined by a shape and a size of the frame of each of the one or more soundproof cells and thickness and flexibility of the film of each of the one or more soundproof cells,
the shielding peak frequency is determined according to an average area ratio of the opening portions of the one or more soundproof cells,
the first natural vibration frequency is included within a range of 10 Hz to 100000 Hz, and
assuming that a circle equivalent radius of the frame is R1 mm, a thickness of the film is t1 μm, a Young's modulus of the film is E1 GPa, and a circle equivalent radius of the opening portion is r μm, a parameter A expressed by following Equation (1) is 0.07000 or more and 759.1 or less, $$A=\sqrt{(E1)}*(t1^{1.2})*(\ln(r)-e)/(R1^{2.8}) \quad (1),$$

where e is a Napier's constant, and ln(x) is a logarithm of x with base e.

27. The soundproof structure according to claim 1,
wherein the one or more soundproof cells are a plurality of soundproof cells arranged in a two-dimensional manner,
the first natural vibration frequency is determined by a geometric form of the frame of each of the one or more soundproof cells and stiffness of the film of each of the one or more soundproof cells,
the shielding peak frequency is determined according to an area of the opening portion of each of the one or more soundproof cells,
the first natural vibration frequency is determined by a shape and a size of the frame of each of the one or more soundproof cells and thickness and flexibility of the film of each of the one or more soundproof cells,
the shielding peak frequency is determined according to an average area ratio of the opening portions of the one or more soundproof cells,
the first natural vibration frequency is included within a range of 10 Hz to 100000 Hz, and
assuming that a circle equivalent radius of the frame is R2 m, a thickness of the film is t2 m, a Young's modulus of the film is E2 Pa, and a density of the film is d kg/m³, a parameter B expressed by following Equation (2) is 15.47 or more and 235000 or less, $$B = t2/R2^2 * \sqrt{(E2/d)} \qquad (2).$$

28. The soundproof structure according to claim 1,
wherein the one or more soundproof cells are a plurality of soundproof cells arranged in a two-dimensional manner,
the first natural vibration frequency is determined by a geometric form of the frame of each of the one or more soundproof cells and stiffness of the film of each of the one or more soundproof cells,
the shielding peak frequency is determined according to an area of the opening portion of each of the one or more soundproof cells,
the first natural vibration frequency is determined by a shape and a size of the frame of each of the one or more soundproof cells and thickness and flexibility of the film of each of the one or more soundproof cells,
the shielding peak frequency is determined according to an average area ratio of the opening portions of the one or more soundproof cells,
the first natural vibration frequency is included within a range of 10 Hz to 100000 Hz, and
assuming that a circle equivalent radius of the frame is R1 mm, a thickness of the film is t1 μm, a Young's modulus of the film is E1 GPa, and a circle equivalent radius of the opening portion is r μm, a parameter A expressed by following Equation (1) is 0.07000 or more and 759.1 or less, $$A = \sqrt{(E1)} * (t1^{1.2}) * (\ln(r) - e)/(R1^{2.8}) \qquad (1),$$

where e is a Napier's constant, and ln(x) is a logarithm of x with base e, and
assuming that a circle equivalent radius of the frame is R2 m, a thickness of the film is t2 m, a Young's modulus of the film is E2 Pa, and a density of the film is d kg/m³, a parameter B expressed by following Equation (2) is 15.47 or more and 235000 or less, $$B = t2/R2^2 * \sqrt{(E2/d)} \qquad (2).$$

* * * * *